(12) United States Patent
Mizrahi et al.

(10) Patent No.: US 8,553,582 B1
(45) Date of Patent: Oct. 8, 2013

(54) TRAFFIC SPRAYING IN A CHASSIS-BASED NETWORK SWITCH

(75) Inventors: Tal Mizrahi, Haifa (IL); Carmi Arad, Nofit (IL); Martin White, Sunnyvale, CA (US); Tsahi Daniel, Palo Alto, CA (US); Yoram Revah, Akko (IL); Ehud Sivan, Zichron Ya'akov (IL)

(73) Assignees: Marvell Israel (M.I.S.L) Ltd., Yokneam (IL); Marvell International Ltd., Hamilton (BM)

( * ) Notice: Subject to any disclaimer, the term of this patent is extended or adjusted under 35 U.S.C. 154(b) by 527 days.

(21) Appl. No.: 12/683,963

(22) Filed: Jan. 7, 2010

Related U.S. Application Data

(60) Provisional application No. 61/143,273, filed on Jan. 8, 2009.

(51) Int. Cl.
*H04L 12/28* (2006.01)

(52) U.S. Cl.
USPC ............................ 370/254; 370/536; 709/217

(58) Field of Classification Search
USPC .................................. 370/254, 536; 709/217
See application file for complete search history.

(56) References Cited

U.S. PATENT DOCUMENTS

| | | | |
|---|---|---|---|
| 6,426,947 B1 * | 7/2002 | Banker et al. ................. | 370/254 |
| 6,535,530 B1 * | 3/2003 | Matsui .......................... | 370/536 |
| 2003/0081599 A1 * | 5/2003 | Wu et al. ........................ | 370/389 |
| 2004/0015582 A1 * | 1/2004 | Pruthi ............................ | 709/224 |
| 2009/0003204 A1 * | 1/2009 | Okholm et al. ............... | 370/230 |

OTHER PUBLICATIONS

Jaramillo et al., "Padded Frames: A Novel Algorithm for Stable Scheduling in Load-Balanced Switches," 40th Annual Conference on Information Sciences and Systems (CISS 2006), Institute of Electrical and Electronics Engineers, pp. 1732-1737, Mar. 2006.

* cited by examiner

*Primary Examiner* — Wei Zhao

(57) ABSTRACT

A method for processing network traffic in a modular switching device that includes a source device, a target device, and a plurality of connecting devices, includes generating a communication unit at the source device, where the communication unit is associated with a unique communication unit identifier, and where the communication unit is to be transmitted to the target device; dividing the communication unit into a plurality of transmission units, including assigning a respective position identifier to each of the plurality of transmission units, where the position identifier is indicative of a position of the transmission unit within the communication unit, and assigning the communication unit identifier to each of the plurality of transmission units; the method further comprising causing the plurality of transmission units to be transmitted in parallel to respective ones of the plurality of connecting devices, where each of the plurality of connecting devices connects the source device to the target device.

14 Claims, 16 Drawing Sheets ized that the background description provided herein

TRAFFIC SPRAYING IN A CHASSIS-BASED NETWORK SWITCH

CROSS-REFERENCE TO RELATED APPLICATION

This application claims the benefit of U.S. Provisional Patent Application No. 61/143,273, entitled "Traffic Spraying in a Modular Chassis" which was filed on Jan. 8, 2009, the entire disclosure of which is hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to communicatively couple the servers to outside network connections, such as backbone network links. As another example, a high-volume website server system can include a large number of web servers, and switches to communicatively couple the web servers to backbone network links.

In these and similar switching applications, it is difficult to efficiently load-balance network traffic and ensure that latency requirements are met, especially when multiple hardware components are used in a single switching system. Moreover, it is particularly difficult to load-balance network traffic when hardware components receive, transmit, and process data at different rates.

SUMMARY

In an embodiment, a method for processing network traffic in a modular switching device that includes a source device, a target device, and a plurality of connecting devices, includes generating a communication unit at the source device, where the communication unit is associated with a unique communication unit identifier, and where the communication unit is to be transmitted to the target device; dividing the communication unit into a plurality of transmission units, including assigning a respective position identifier to each of the plurality of transmission units, where the position identifier is indicative of a position of the transmission unit within the communication unit, and assigning the communication unit identifier to each of the plurality of transmission units; the method further comprising causing the plurality of transmission units to be transmitted in parallel to respective ones of the plurality of connecting devices, where each of the plurality of connecting devices connects the source device to the target device.

In an embodiment, a method for processing network traffic in a modular switching device includes receiving a plurality of transmission units, where at least some of the plurality of transmission units were transmitted in parallel via a plurality of uplinks, and where each of the plurality of transmission units includes a communication frame identifier that identifies a communication frame that includes the transmission unit and a position identifier indicative of a position of the transmission unit within the identified communication frame; and generating a reassembled communication frame that includes at least some of the received plurality of transmission units based on respective communication frame identifiers and position identifiers of the plurality of transmission units.

In an embodiment, a modular switching apparatus includes a first processing device coupled to a first plurality of uplinks; a second processing device coupled to a second plurality of uplinks; and a plurality of connecting devices, where each of the plurality of connecting devices is coupled to a respective one of the first plurality of uplinks and a respective one of the second plurality of uplinks; where the first processing device is configured to transmit a plurality of portions of a communication frame to the second processing device, where each of the plurality of portions is transmitted via a respective one of the first plurality of uplinks in parallel with the rest of the plurality of portions; and where the first processing device is configured to format the plurality of portions such that each of the plurality of portions includes a unique identifier of the communication frame and a position identifier that identifies a position of the portion within the communication frame.

In an embodiment, a method of operating a modular switching device that includes a processing device communicatively coupled to a plurality of connecting devices, includes determining that at least one of the plurality of connecting devices is not synchronized with at least one other connecting device of the plurality of connecting devices, causing a plurality of transmission units to be transmitted from the processing device back to the processing device via the plurality of connecting devices, where each of the plurality of transmission units is transmitted in parallel to a respective one of the plurality of connecting devices; and transmitting a priority flow control (PFC) transmission unit to at least one of the plurality of connecting devices in view of the timing of arrival of the plurality of transmission units at the processing device.

In an embodiment, a modular switching apparatus includes a first processing device coupled to a first plurality of uplinks; a second processing device coupled to a second plurality of uplinks; a plurality of connecting devices, where each of the plurality of connecting devices is coupled to a respective one of the first plurality of uplinks and a respective one of the second plurality of uplinks; and a synchronizer configured to determine that at least one of the plurality of connecting devices is not synchronized with at least one other connecting device of the plurality of connecting devices, cause a plurality of transmission units to be transmitted from the first processing device back to the first processing device via the plurality of connecting devices, where each of the plurality of transmission units is transmitted in parallel to a respective one of the plurality of connecting devices; and transmit a priority flow control (PFC) transmission unit to at least one of the plurality of connecting devices in view of the timing of arrival of the plurality of transmission units at the first processing device.

DETAILED DESCRIPTION

Example switching methods and apparatus are described herein in the context of Ethernet networks. One of ordinary skill in the art will recognize, in light of the disclosure and teachings herein, that similar methods and apparatus are suitable for use in other communication networks as well.

Figure 1:
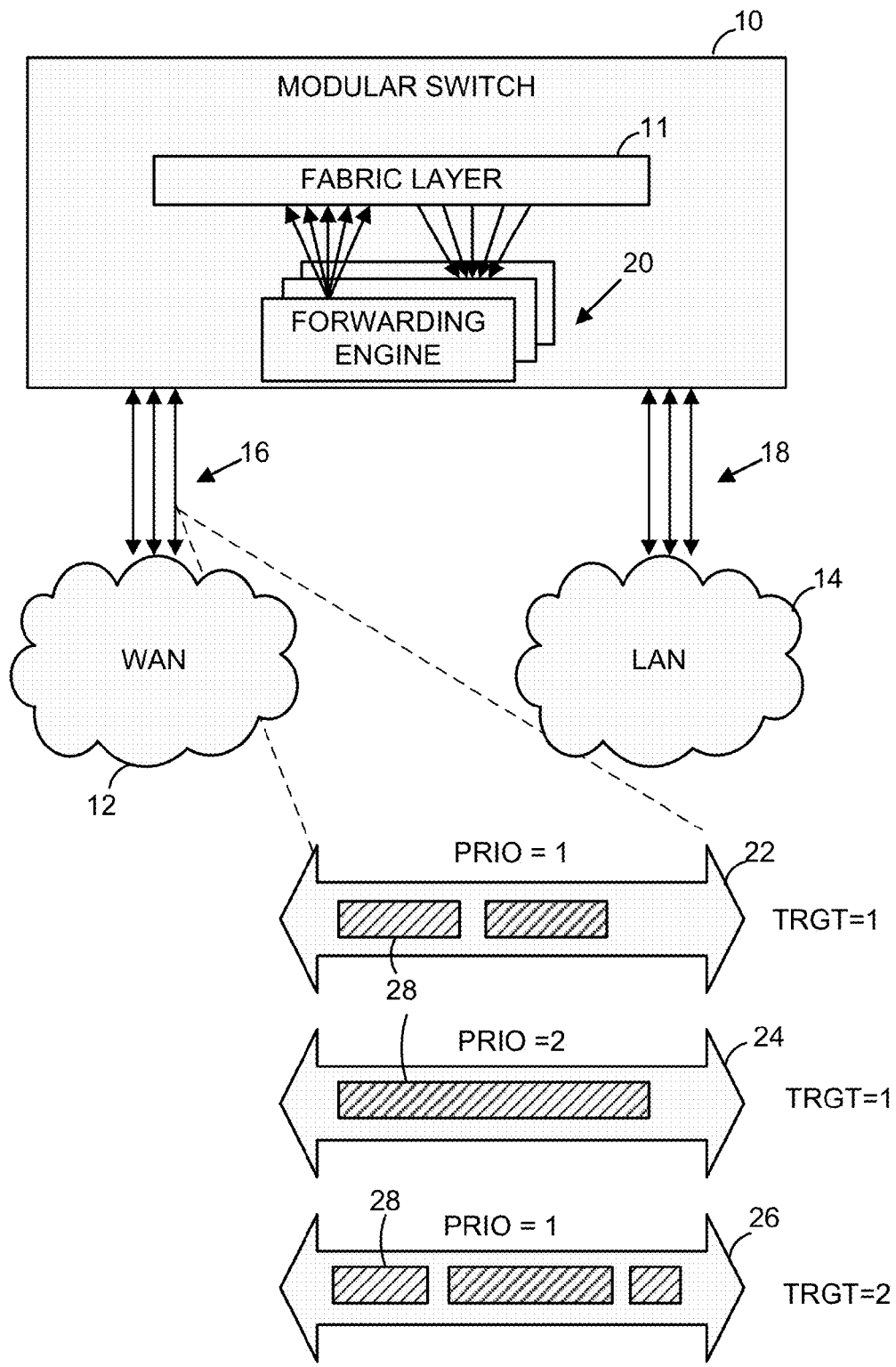
FIG. 1 is a block diagram of an example communication system in which a modular network switch is utilized in accordance with an embodiment of the present disclosure.

FIG. 1 is a block diagram of a modular switch 10, capable of efficiently and reliably spraying traffic through a fabric layer 11, in an example arrangement between an external network 12 and an internal network 14. The modular switch 10 includes a chassis to support several modules such as, for example, "blade" cards compatible with Peripheral Component Interconnect (PCI), PCI Express, or similar standard. At least some of the cards include one or several components that support networking functions, referred to herein as "packet processors." As discussed in more detail below, a packet processor of the modular switch 10 generally includes a network interface with one or several network ports to communicate with the network 12 or 14 via respective groups of links 16 and 18, and an internal interface with one or several uplink ports to communicate with other cards mounted on the chassis via so-called uplinks, or communication links internal to the modular switch 10.

In some systems, the speed of network ports is substantially higher than the speed of individual uplinks. To ensure that the modular switch 10 introduces little latency to the network traffic flowing through the modular switch 10, and to provide quality-of-service (QoS) compliance, forwarding engines 20 implement methods for operating virtual output queues (VoQs) that are specific to destinations as well as traffic priorities, aggregating data packets into communication frames using dynamic threshold values to control queue size, segmenting the communication frames into transmission units (e.g., datagrams or "cells") with headers that include both an identifier of the corresponding communication frame and the relative sequence of the transmission unit within the communication frame, efficiently synchronizing connecting devices used to interconnect packet processors, etc. These and other techniques for traffic spraying, load-balancing, and synchronization are discussed in detail below with reference to FIGS. 2-16B.

Referring still to FIG. 1, in an embodiment the modular switch 10 is a part of data server, router, or other host performing a networking function. The external network 12 in this example is a wide area network (WAN) such as the Internet, and the internal network 14 is a local area network (LAN) such as one serving a particular a corporation, a university, or any other organization. Additionally or alternatively, the modular switch 10 functions as a router between two or more several wide area networks or local area networks.

The modular switch 10 communicates with the network 12 in a wired manner or wireless manner via a group of high-speed links 16 that includes, for example, T-carrier links such as T1s, fiberoptic cables, or any other communication links including those currently known to those of ordinary skill in the art. The network 14 may similarly communicate with the modular switch 10 via a similar wired or wireless connection. Further, some or all of the links in the groups 16 and 18 correspond to a plurality of physical carriers such as wires, cables, or carrier radio frequencies.

With continued reference to FIG. 1, the links 16 and 18 carry several data flows 22-26, each characterized by some or all of a source, target, and a type of traffic. The type of traffic corresponds to a certain traffic class (TC), a class of service, or one of a set of priority levels defined for the network 12 or 14. Each of flows 22-26 includes multiple data units (also referred to herein as data packets) 28 (e.g., Ethernet packets) of equal or different length, although some flows are generally associated with long packets, while other flows are typically associated with short packets. In general, the data packet 28 travels either in the inbound or outbound direction relative to the network 12 or 14.

Depending on the implementation or configuration, the modular switch 10 associates the target of a data packet with a certain device or a certain port on the device for the purposes of grouping data packets into flows. Unless indicated otherwise, "target" in the discussion below refers to a target device or target port. Further, certain time-critical network traffic (e.g., video streaming) is assigned a relatively high priority, while other delay-tolerant traffic is assigned a lower priority. In some embodiments, the number and the types of priorities the modular switch 10 can support is user-configurable. In the example illustrated in FIG. 1, the flow 22 includes priority 1 data packets traveling toward a destination device 1; the flow 24 includes priority 2 data packets traveling toward the same target; and the flow 26 includes priority 1 data packets traveling toward a target device 2.

Figure 2:
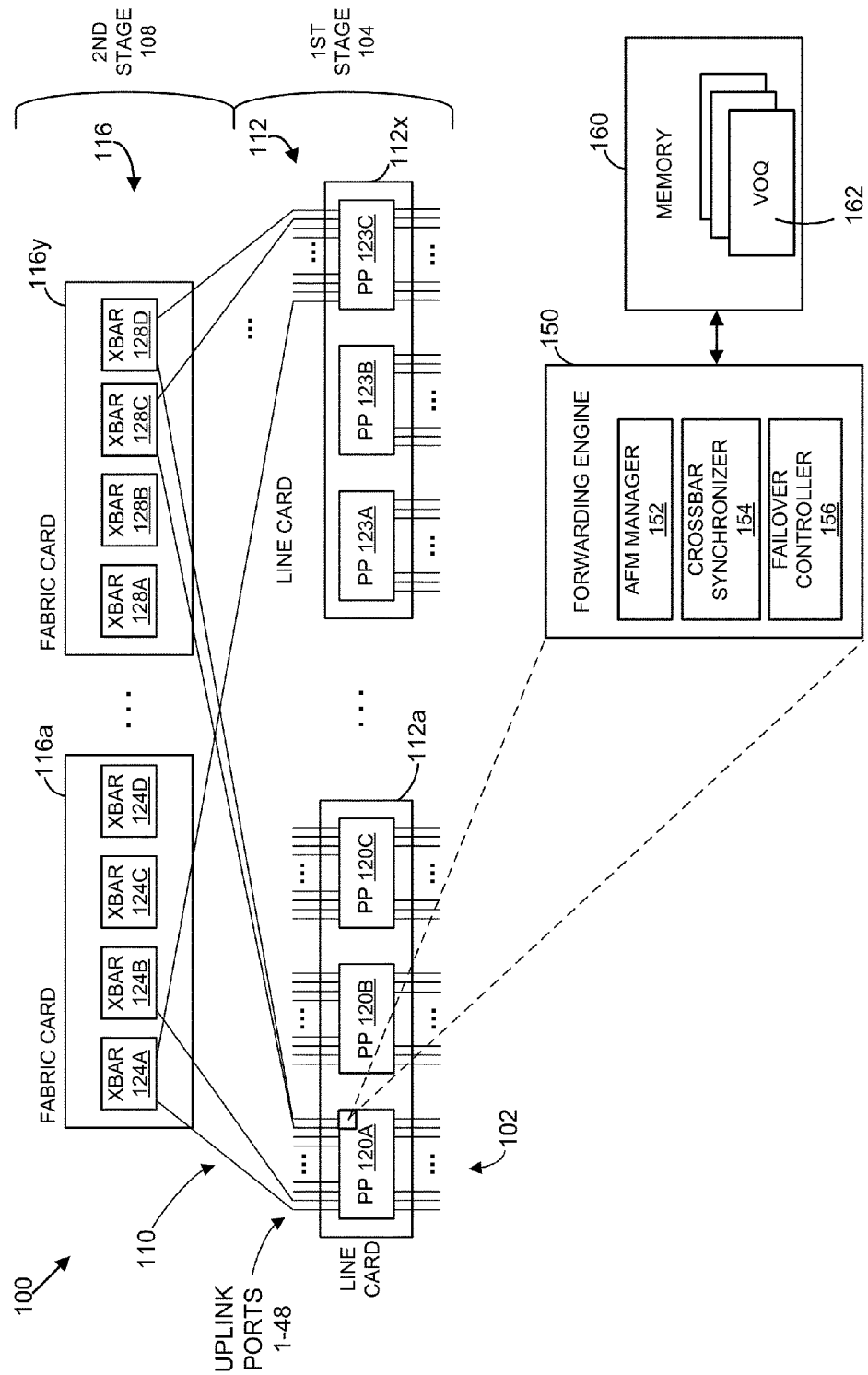
FIG. 2 is a block diagram of an example modular network switch that includes several line cards and several fabric cards in accordance with an embodiment of the present disclosure.

FIG. 2 is a diagram of an example modular switch 100 that is suitable for use as the switch 10 of FIG. 10 as well as in data centers, server farms, or any systems that require switching or routing between a large number of ports. The modular switch 100 comprises a plurality of switching stages including a first stage 104 and a second stage 108. The first stage includes a first plurality of ports 102, referred to herein as front ports or network ports. The network ports 102 are utilized for coupling to LANs, WANs, servers, other switching systems, etc. The first stage also includes a second plurality of ports, referred to herein as uplink ports. The uplink ports are utilized for coupling the first stage 104 to the second stage 108 via communication links 110 referred to herein as uplinks. The second stage 108 also includes a plurality of ports that are coupled to the uplinks 110.

In the example embodiment depicted in FIG. 2, some of the network ports 102 transmit or receive network traffic at different speeds. For example, some of the network ports 102 transmit or receive network at 1 gigabit per second (Gb), other ports operate at 10 Gb, yet other ports operate 100 Gb. In general, there is a wide range and a large number of different speeds at which the network 102 operate. However, the uplinks 110 operate at the same constant speed that typically is much lower than the speed of the fastest one of the network ports 102. For example, the uplinks operate at 10 Gb while the fastest network operate at 100 Gb.

Each stage in the plurality of stages comprises a plurality of devices arranged in groups. In one embodiment, the first stage 104 comprises X groups of packet processors (PPs), and the second stage 108 comprises Y groups of crossbar devices that provide interconnectivity between PPs in the first stage 104. In some embodiments, PPs are used as crossbar devices in the second stage 108. In one embodiment, each group of PPs is arranged on a corresponding card mounted in a chassis. In this embodiment, the first stage 104 comprises X cards 112 (referred to herein as "line cards"), and the second stage 108 comprises Y cards 116 (referred to herein as "fabric cards"). In the embodiment illustrated in FIG. 2, the modular switch 100 comprises a chassis switching system with the total of M PPs and N crossbar devices mounted in a chassis.

For ease of explanation, the groups of PPs in the first stage 104 will be referred to as line cards and the groups of crossbar devices in the second stage 108 will be referred to as fabric cards in the description below. In accordance with an embodiment, groups of devices are arranged on separate cards as seen in FIG. 2. It is noted that each group of devices need not be arranged on a separate card. Rather, in accordance with an embodiment, multiple groups of devices are arranged on a single card. Additionally, the modular switch 100 need not be a chassis switching system and the groups of the PPs or crossbar devices need not be arranged on cards in a chassis.

Generally speaking, in accordance with an embodiment, when a data unit is received via one of the network ports 102, the data unit is forwarded to one or more of the fabric cards 116. The one or more fabric cards 116 then forward the data unit to one of the line cards 112, and the data unit is finally transmitted via one of the front ports. However, when a data unit arrives at a first high-speed ingress port and is directed toward a second high-speed egress port, simply selecting a suitable low-speed uplink port to forward the data unit toward the egress port would result in the reduction of speed of the flow to which the data unit belongs. Accordingly, the PP that receives the data unit transmits portions of the data unit as separate datagrams via several uplinks toward one or more crossbar devices, and the one or more crossbar devices similarly transmit the received datagrams toward the PP that includes the egress port. These datagrams, that may be similar to Ethernet packets, are referred to herein as "cells."

To properly route cells, a source PP in the first stage 104 generates forwarding tags for each cell which the crossbar devices use to route the cells to the target PP. Further, because it is more efficient to route larger chunks of data through the stages 104 and 108, in accordance with an embodiment, PPs such as the PP 120a are configured to aggregate data packets received via the network ports 102 in VoQs created and managed for each flow identified by a target and a priority. The PPs then generate frames that include one or several data packets stored in the corresponding VoQ, and typically generate cells using the frame rather than the original data packets. As used herein, communication frames (or just "frames") are communication units that include data that shares a certain target and a certain type of traffic (e.g., a class of service, a traffic class). It is noted that in some alternative embodiments, non-aggregated data units are routed through stages 104 and 108.

In the example system 100, each line card 112 comprises three PPs. For example, the line card 112a includes a PP 120a, a PP 120b, and a PP 120c, and the line card 112b includes a PP 123a, a PP 123b, and a PP 123c. In other embodiments, the line cards 112 have more or less than three PPs, and each line card 112 need not have the same number of PPs. In the example system 100, each fabric card comprises four PPs. For example, the fabric card 116a includes a PP 124a, a PP 124b, a PP 124c, and a PP 124d. Also, the fabric card 116y includes a PP 128a, a PP 128b, a PP 128c, and a PP 128d. For clarity, the PPs 124a-124d and 128a-128-d are illustrated in FIG. 2 as crossbar ("XBAR") devices.

As discussed above, the system 100 comprises a plurality of packet processors (PPs) arranged in stages and groups as discussed above. Each PP is a switching device and itself has a plurality of ports. Generally speaking, each PP is capable of receiving a data unit, such as a packet or frame, and making a decision regarding the port of the PP via which the data unit should be transmitted. Then, the PP transmits the data unit via the determined port of the PP.

In an embodiment, each PP in the first stage 104 is coupled to a plurality of fabric cards 116 via at least some of the uplinks 110. For example, each PP in the first stage 104 is coupled to at least one PP in each of the fabric cards 116. As another example, each PP in the first stage 104 is coupled to every PP in the second stage 108. As yet another example, each PP in the first stage 104 is coupled to a different subset of PPs in the second stage 108. In FIG. 2, only some of the uplinks 110 between the line cards 112a and 112x and the fabric cards 116a and 116y are illustrated, whereas other uplinks, such as uplinks between other PPs and the fabric cards 116, are not illustrated to avoid obscuring the figure.

In one embodiment, the system 100 includes sixteen line cards 112 (X=16) and eight fabric cards 116 (X=8), where each line card 112 includes three PPs and each fabric card 116 includes four crossbar devices. In this embodiment, there are thus 48 PPs (M=48) in the first stage 104 and 32 crossbar devices (N=32) in the second stage 108. In an embodiment, each PP in the first stage 104 provides 48 ports: 16 front ports and 32 uplink ports. Thus, if there are 48 PPs in the first stage 104, the first stage 104 would provide 768 front ports and 1536 uplink ports.

Each PP in the first stage 104 need not have the same amount of ports as each crossbar device in the second stage 108. In an embodiment, each PP in the first stage 104 includes 48 ports, whereas each crossbar device in the second stage 108 includes 32 ports. In this embodiment, if there are 32 PPs in the first stage 104 and each crossbar device in the first stage 104 provides 24 front ports and 24 uplink ports, the first stage 104 would provide 768 front ports and 768 uplink ports. If there are 24 PPs in the second stage 108 and each crossbar device in the second stage 108 provides 32 ports, the second stage 108 would be capable of connecting to 768 uplinks.

In an embodiment, each uplink port of every PP in the first stage 104 is identified using sequential numbers, for example. In an embodiment, the uplink ports of the PP 120a are numbered 1, 2, . . . 32. Each uplink port number in this embodiment also uniquely corresponds to a respective one of the N crossbar devices. As discussed below, uplink port numbers are used as cell sequence numbers during packet or frame segmentation, and are used during packet or frame reassembly to identify the position of each cell within the packet or frame.

With continued reference to FIG. 2, each PP in the first stage 104 includes a forwarding engine 150 to process data packets arriving and leaving via the network ports 102, as well as data packets arriving and leaving via uplink ports from other PPs via the crossbar devices in the second stage 108. As illustrated in FIG. 2, the forwarding engine 150 includes an aggregated frame multiplexing (AFM) manager 152, a crossbar synchronizer 154, and a failover controller 156. Some or all of the packet processors 104 implement the forwarding engine 150 in software, hardware, firmware, or any suitable combination thereof. In operation, the forwarding engine 150 interacts with a memory 160 in which several VoQs 162 are configured for various combinations of target and priority parameters.

To better explain the operation of some of the components of the modular switch 100 discussed below, FIG. 3 generally illustrates aggregation of several Ethernet data packets 180-188 into communication frames 190, 192, and 194 using VoQs 210-214, and subsequent segmentation of the frames 190-194 into corresponding sequences of cells $200_1$, $200_2$, . . . $200_N$, $202_1$, $202_2$, . . . $202_N$, and $204_1$, $204_2$, . . . $204_N$ in accordance with an embodiment of the disclosure. A packet processor such as the packet processor 120a illustrated in FIG. 2 receives the data packets 180-188 at one or more network ports 102 and, upon processing the data packets 180-188 in the ingress pipeline and egress pipeline discussed below, transmit at least the payload of the data packets 180-188 to another packet processor operating in the same chassis (although not necessarily within the same line card 112a).

In this example scenario, the packets 180 and 184 travel toward a target $T_1$ and belong to a flow with the priority $P_1$, the packets 182 and 188 travel toward the same target $T_1$ but belong to a flow with the priority $P_2$, and the packet 186 travels toward a target $T_1$ and belongs to a flow with a priority P3. The VoQs 210-214 in the scenario illustrated in FIG. 3 are initially empty.

The AFM manager 152 (see FIG. 2) stores the data packet 180 in a VoQ 210 dedicated to the target $T_1$ and the priority $P_1$. In an embodiment, the MAC address of the data packet 180 is removed to preserve space, and replaced with a shorter internal packet header discussed below with reference to FIG. 4E. Because the size of the data packet 180 is substantially smaller than the size of the frame 190, the AFM manager 152 typically will not attempt to transmit the data packet 180 to the destination immediately (however, as discussed in more detail below, the AFM manager 152 sometimes equates the size of the data packet 180 with the size of the frame 190 and effectively bypass the VoQ 210, while in other cases the AFM manager 152 decides to "pad" the frame 190 with dummy packets to trigger transmission of the frame 190 without changing the size of the frame 190). Upon arrival of the data packet 182, the AFM manager 152 adds the packet 182 to the VoQ 212 dedicated to the target $T_1$ and the priority $P_2$. Next, when the data packet 184 arrives followed by the data packets 186 and 188, the AFM manager 152 adds these data packets to the VoQs 212, 214, and 210, respectively.

It is noted that neither the VoQs 210-214 nor the communication frames 190-194 are required to be of the same size. In other words, the AFM manager 152 independently manages each of the VoQs 210 and 214. It is be further noted that a packet processor supports any desired number of priorities and targets, and accordingly maintains any desired number of VoQs. In some embodiments, each target (e.g., targets $T_1$ and $T_2$) is a packet processor, while in other embodiments each target is a network port on a particular packet processor. Also, a packet processor in at least some embodiments maintains a certain number of multicast VoQs to store data packets traveling to multiple targets, which can also be packet processors or ports. If desired, each multicast VoQ can be associated with a particular priority.

Figure 3:
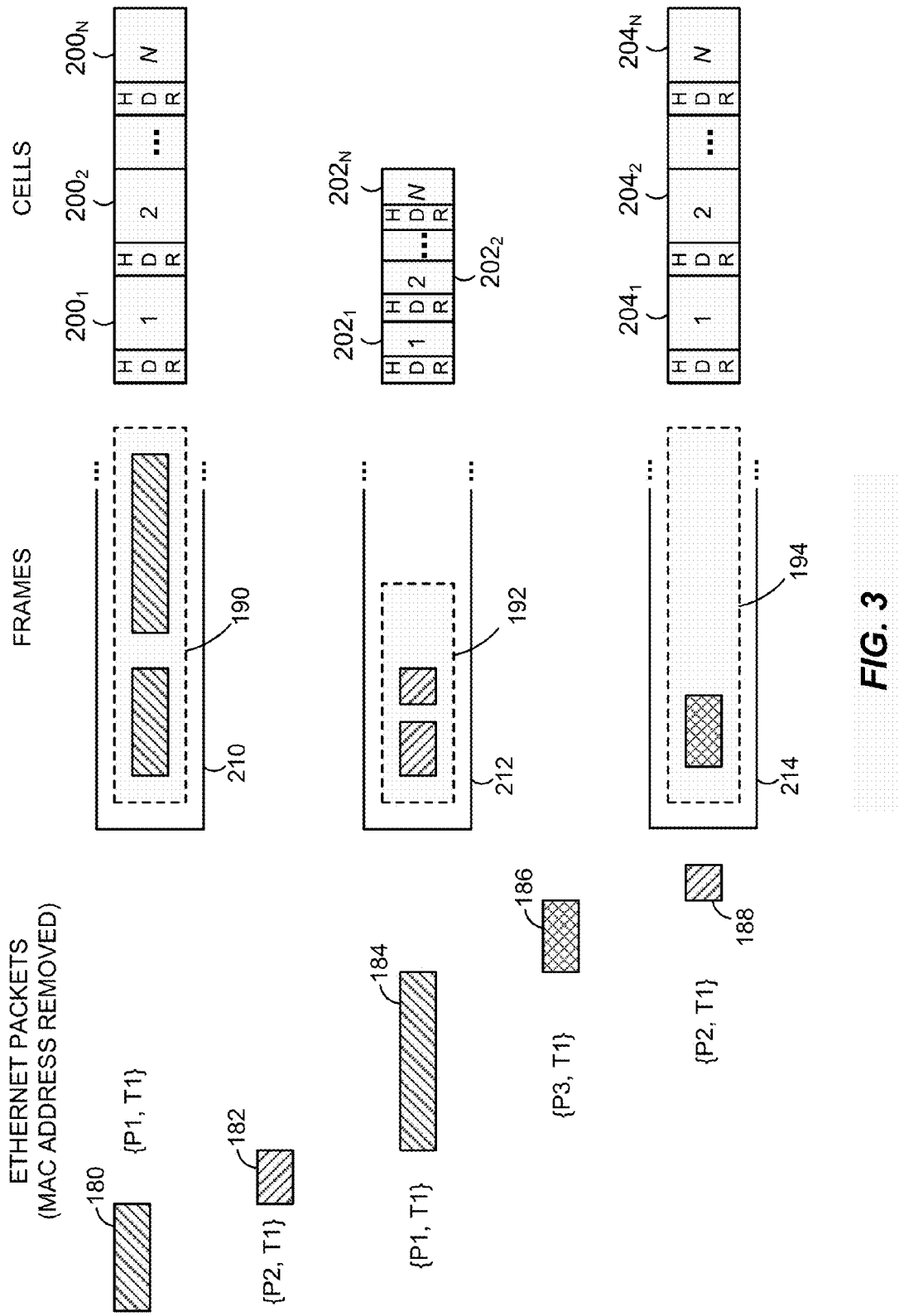
FIG. 3 is a block diagram that illustrates aggregation of data packets into a communication frame and segmentation of the communication frame into several cells in accordance with an embodiment of the present disclosure.

With continued reference to FIG. 3, the AFM manager 152 segments the communication frame 210 into cells $200_1$, $200_2$, . . . $200_N$, each having a respective cell header (discussed below with reference to FIG. 4B), and removes the communication frame 210 from the VoQ 190. As discussed in detail below, the AFM manager 152 determines that a certain VoQ stores enough data to aggregate into a frame when a certain size threshold is reached, or when one or more data packets stored in the VoQ reach a certain age, or in response to other conditions. In an embodiment, each of the cells $200_1$, $200_2$, . . . $200_N$ is of the same size so that each of the N crossbar devices processes the cell within the same amount of time and makes state transitions simultaneously with every other crossbar device. Further, when the cells $200_1$, $200_2$, . . . $200_N$ have the same size, in an embodiment, each of the uplinks being used transmits the cell within the same amount of time. In this manner, the AFM manager 152 more easily synchronizes the crossbar devices.

The AFM manager 152 similarly segments the frames 192 and 194 into groups of cells $202_1$, $202_2$, . . . $202_N$, and $204_1$, $204_2$, . . . $204_N$, respectively. It is noted that as a result of segmenting a communication frame into cells, a data packet may be divided among several cells.

It is noted that in an embodiment, each frame corresponds to both a particular target and a particular priority. Thus, a VoQ used for unicast transmissions stores data packets having not only a common destination but also a common latency requirement or other quality characteristic of the priority.

Figure 4A:
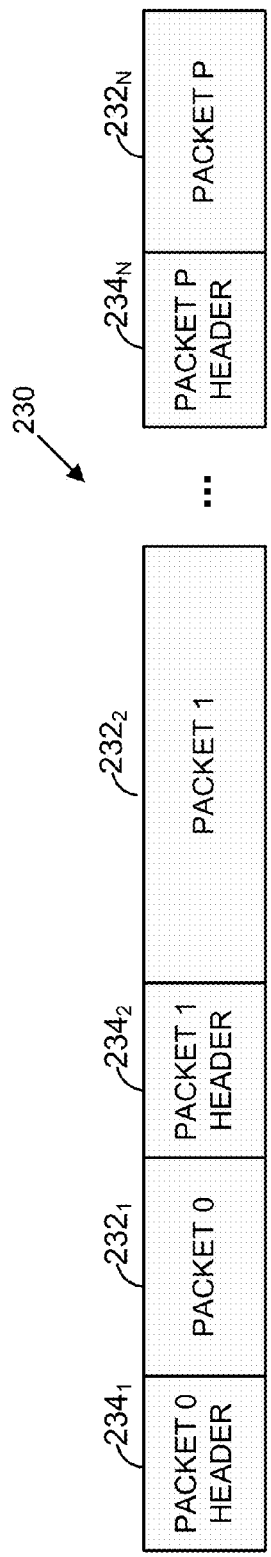
FIG. 4A is a block diagram of an example communication frame used to transmit data between devices in the network switch of FIG. 2 in accordance with an embodiment of the present disclosure.

Prior to discussing further details of some of the components that are configured to implement the scheme discussed above, FIGS. 4A-4D illustrate example formats of frames, cells, and respective headers in accordance with embodiments of the disclosure. In particular, FIG. 4A illustrates an example communication frame 230 that is transmitted as several cells between two PPs (e.g., PP 120a and 123c) via several crossbar devices (e.g., crossbar device 124a, crossbar device 124b, etc.). Each of the frames 190-194 discussed above can be formatted in accordance with the format illustrated in FIG. 4A. The communication frame 230 does not require a frame header or trailer because the modular switch 100 transmits each communication frame 230 as a set of cells. Rather, the frame 230 is a group of an integer number of packets $232_1$, $232_2$, ... $232_N$ and respective headers $234_1$, $234_2$, ... $234_N$. As indicated above, each of the packets $232_1$, $232_2$, ... $232_N$ in an embodiment is an Ethernet packet received at a network port with the MAC address removed.

Figure 4B:
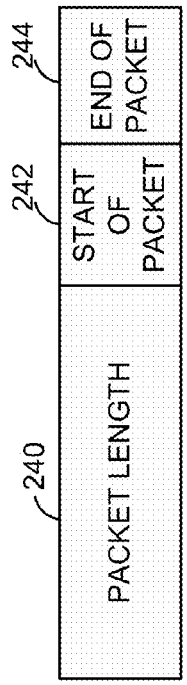
FIG. 4B is a block diagram of an example packet header used in communications internal to the network switch of FIG. 2 in accordance with an embodiment of the present disclosure.

Referring to FIG. 4B, each of the packet headers $234_1$, $234_2$, ... $234_N$ is formatted as a header 240 that includes a packet length indicator 242, a start-of-packet indicator 244, and an end-of-packet indicator 246. In an embodiment, the packet length indicator 242 is 16 bits long, and each of the indicators 244 and 246 is a one-bit flag. Accordingly, the packet header 240 in this embodiment is two bytes long.

Figure 4C:
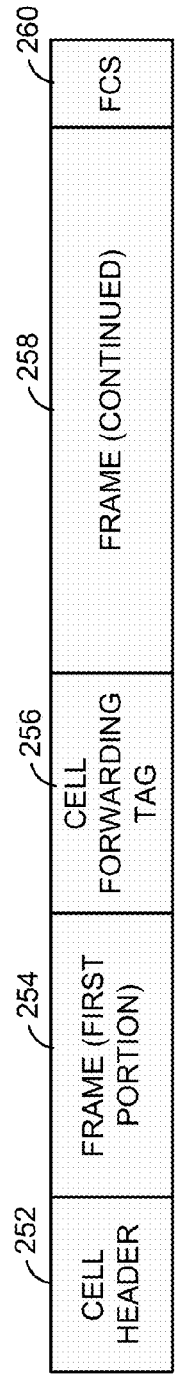
FIG. 4C is a block diagram of an example communication cell used to transmit data between devices in the network switch of FIG. 2 in accordance with an embodiment of the present disclosure.

FIG. 4C illustrates an example communication cell 250 which is transmitted between a PP and a crossbar device. The cell 250 includes a cell header 252 (illustrated in FIG. 4D), a cell forwarding tag 256 (illustrated in FIG. 4E), and a frame sequence check (FCS) field 260 following the payload of the cell, i.e., a corresponding portion of the communication frame segmented into several cells, in the fields 254 and 258. More specifically, the first portion of a frame payload occupies the remainder of a 12-byte field occupied by the MAC address in an Ethernet packet following the cell header 252. In at least some of the embodiments, cells are routed between PPs and crossbar devices as regular Ethernet traffic. However, rather than relying on the MAC address of a data packet, a crossbar device such as the crossbar 124B uses the cell forwarding tag 256 to route the data packet to the target packet processor, and ignores the MAC address completely. Thus, in an embodiment, by overwriting a portion of the MAC address field with a cell header and using the remainder of the MAC address field to transmit data, the AFM manager 152 reduces overhead and improves bandwidth utilization.

In one embodiment, the cell header 252 occupies two bytes, the field 254 accordingly spans ten bytes, and the FCS field 258 occupies four bytes. The field 258 occupies the remainder of the cell 250. Together, the fields 254 and 258 amount to the length of the frame divided by N (because the N cells into which a communication frame is divided are preferably of the same length).

Figure 4D:
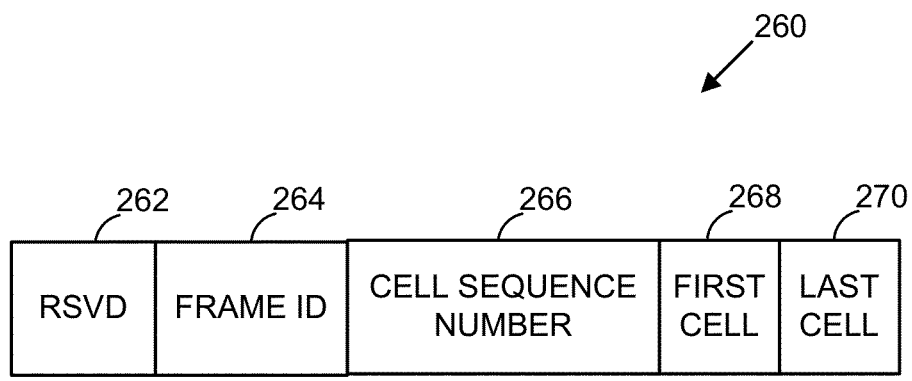
FIG. 4D is a block diagram of an example cell header in accordance with an embodiment of the present disclosure.

FIG. 4D illustrates a cell header 260 in one example embodiment. A one-bit reserved field 262 is unused in some embodiments, or is used to signal a multicast (MC) packet in alternative embodiments. A frame identity field 264 identifies the frame to which the cell belongs. In an embodiment, the field 264 occupies eight bits. It will be noted that each cell identifies the frame to permit flexible and accurate reassembly at the receiving packet processor, discussed in more detail with respect to FIGS. 10A-B. In at least some of the embodiments, frame identifiers are assigned successively so that the identifier of a frame transmitted later in time is a larger number than the identifier of a frame transmitted earlier in time. In this manner, cells received out-of-order are detected, and crossbar devices that drop cells are easily identified.

Further, to identify the position of a cell within the frame identified in the field 264, the cell header 260 also specifies the corresponding cell sequence number using the field 266. For a typical modular switch 100, the cell sequence number is five bits long. Of course, it is also possible to use a shorter or, conversely, a longer field to specify the cell sequence number.

In an embodiment, the uplink port number of a cell is used as the cell sequence number in the field 266, although this need not necessarily be the case. Referring back to FIG. 2, for example, the PP 120a assigns uplink port numbers 1, 2, ... N to each of the N cells routed to the N crossbar devices in the second stage 108.

Still further, fields 268 and 270 in this embodiment are single-bit flags that indicate whether the cell is the first cell or the last cell in the frame, respectively. Using the fields 268 and 270, the target packet processor determines whether a frame is complete. Also, in the event that one or several crossbar devices 124A-D or 128A-D fail, the fields 268 and 270 signal an earlier-than-expected end of a frame.

Figure 4E:
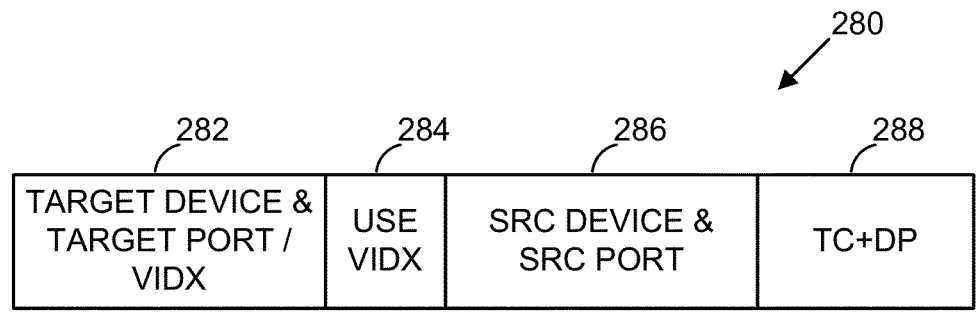
FIG. 4E is a block diagram of an example cell forwarding tag in accordance with an embodiment of the present disclosure.

An example of a cell forwarding tag 280 that is used in the communication cell 250 (or a similar datagram) is illustrated in FIG. 4E. The cell forwarding tag 280 spans eight bytes and includes a target device and/or port identifier 282 that may be 12 bits long, for example. In some cases, flag 284 is set to logical TRUE to indicate that the field 282 includes a multi-target group index (VIDX) instead. The cell forwarding tag 280 also includes a source device and source port identifier 286 and a traffic class field 288. Referring back to FIG. 4C, a cell with the cell header 252 formatted as illustrated in FIG. 4D and the cell forwarding tag 256 formatted as illustrated in FIG. 4E has a 14-byte overhead.

Next, several components of a packet processor that operates in the modular switch 100, in accordance with an embodiment of the disclosure, are discussed with reference to FIGS. 5-9 and 12-13, and an example frame reassembly algorithm is discussed in connection with FIGS. 10A-B.

Figure 5:
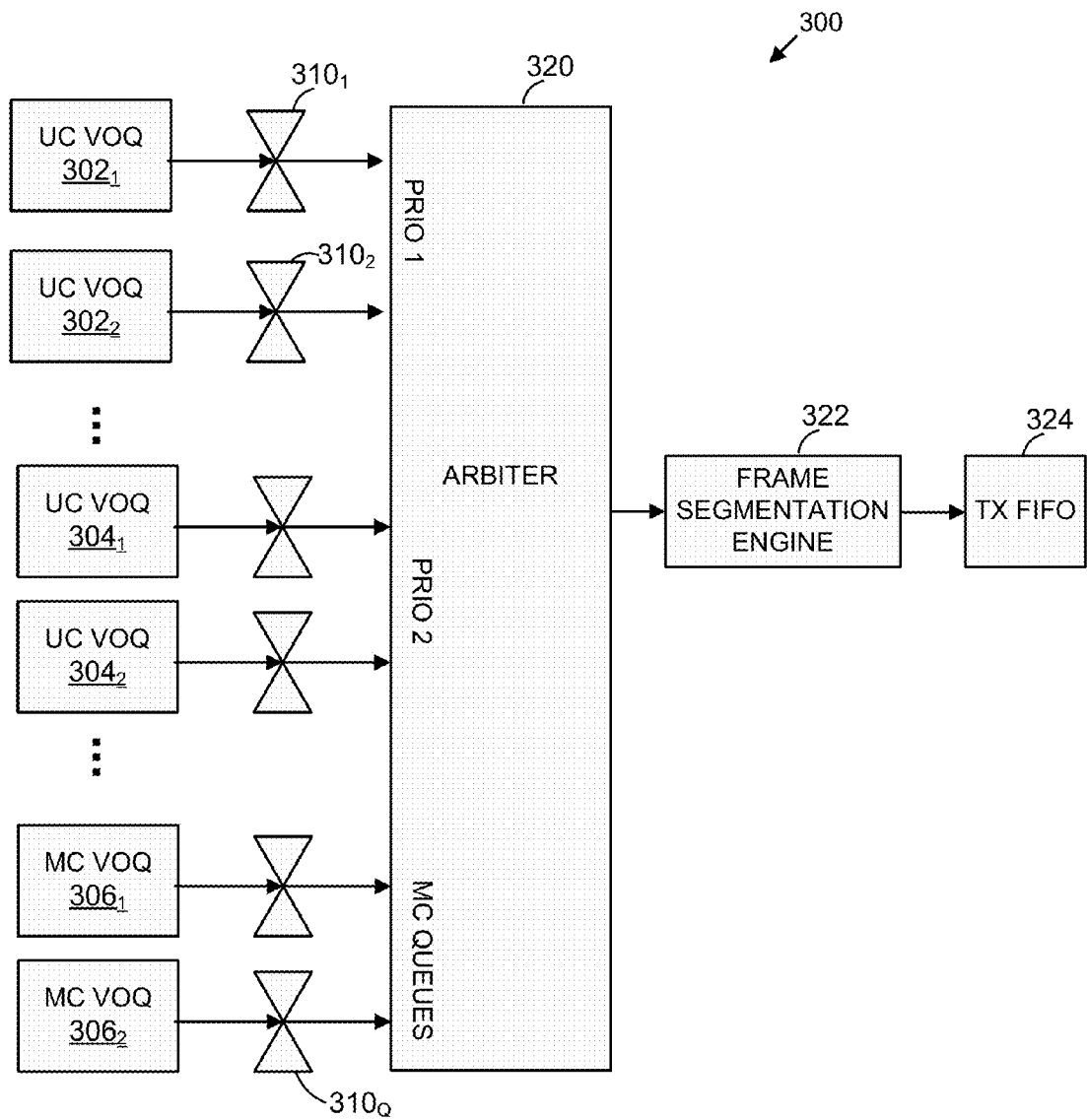
FIG. 5 is a block diagram of an example frame aggregation and segmentation pipeline of a packet processor in accordance with an embodiment of the present disclosure.

Referring first to FIG. 5, a frame aggregation and segmentation pipeline 300 in accordance with an embodiment of the disclosure, operates within a PP such as the PP 120a, for example, and includes unicast (UC) VoQs $302_1$ and $302_2$ to store data packets associated with a flow having priority 1, VoQ $304_1$ and $304_2$ to store data packets associated with a flow having priority 2, etc. The UC VoQs $302_1$ and $302_2$ store data packets addressed to two respective targets that may be devices or ports, for example. In general, there is any desired number of queues associated with each of the priorities supported by the packet processor. In addition to several unicast queues, the pipeline 300 includes one or several multicast (MC) VoQs $306_1$ and $306_2$ to store data packets sent to multiple targets within a certain group.

In accordance with an embodiment, the frame aggregation and segmentation pipeline 300 provides a separate frame aggregator $310_1$, $310_2$, $310_Q$ for each VoQ. In operation, an arbiter 320 selects between the outputs of the VoQs $310_1$-$310_Q$, which define signals indicative of a presence of completed frames. As described in more detail below, the arbiter 320 first selects a VoQ within each group of equal-priority VoQs using the round-robin approach or any other suitable technique, and then select a VoQ from among the "winners" of the first selection stage. Next, the arbiter 320 forwards the selected frame to a frame segmentation engine 322. It is noted, however, that the arbiter 320 need not assemble the frame or transfer the contents of the selected VoQ to another memory location. Instead, the arbiter 320 in an embodiment merely reports the identity and/or the location of the selected VoQ to the frame segmentation engine 322 (discussed below with reference to FIG. 8). Finally, the cells output by the frame segmentation engine 322 are directed to a Tx FIFO queue 324.

Figure 6:
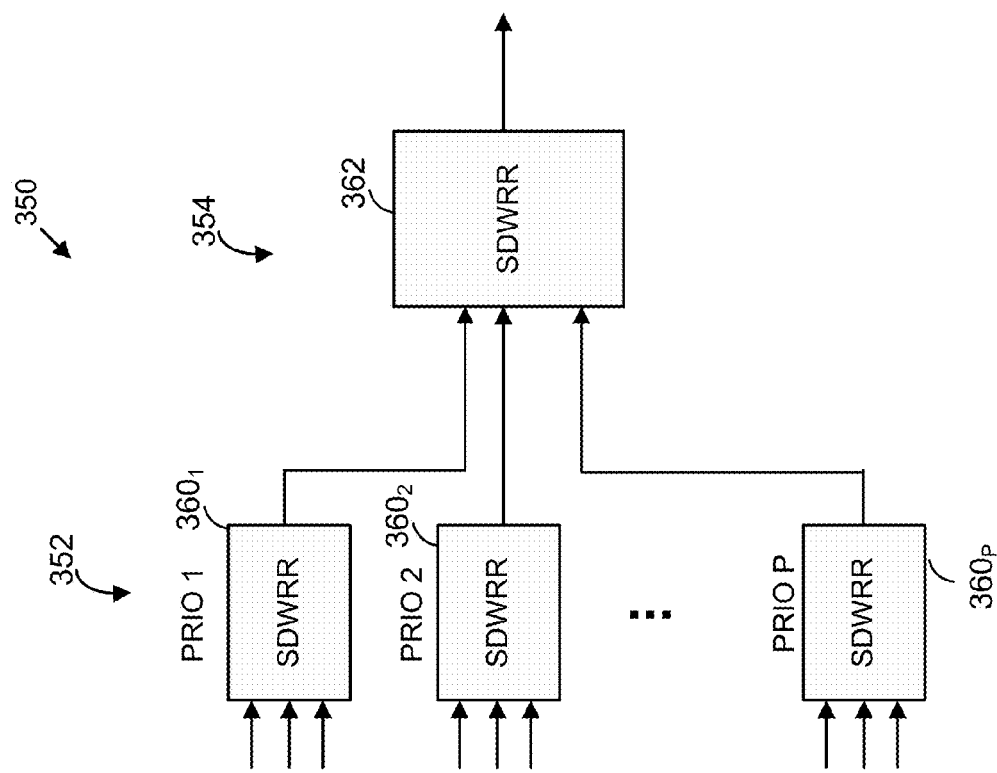
FIG. 6 is a block diagram of an example arbiter that is suitable for use in the frame aggregation and segmentation pipeline illustrated in FIG. 5 in accordance with an embodiment of the present disclosure.

Now referring to FIG. 6, an example arbiter 350 is suitable for use in the forwarding engine 20 or 150. In particular, the arbiter 350 selects between available frames in a frame aggregation and segmentation pipeline (such as the pipeline 300). In accordance with an embodiment, the arbiter 350 includes two stages, a stage 352 and a stage 354. The stage 352 includes several Scheduler Weighed Round Robin (SDWRR) selectors 360. Each of the selectors 360 corresponds to a respective one of the set of P priorities supported by the PP, includes several inputs to receive signals from the respective frame aggregators and an output to a respective input of a SDWRR selector 362 of the second stage 354. Of course, other implementations of the arbiter 350 are possible including, for example, an embodiment that includes only one stage.

Figure 7A:
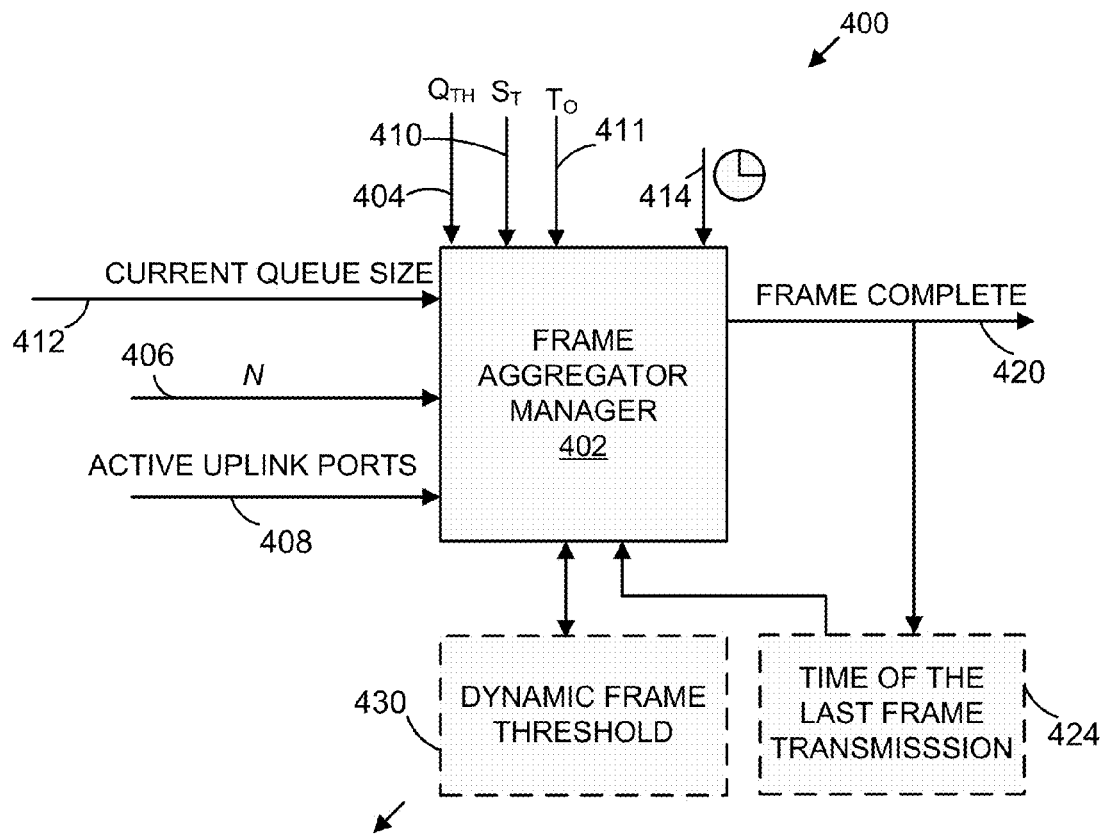
FIG. 7A is a block diagram of an example frame aggregator adapted to dynamically control the threshold value for a data queue in accordance with an embodiment of the present disclosure.

Next, FIG. 7A illustrates an example frame aggregator 400 adapted to dynamically adjust the size of a communication frame to be divided into several cells in response to changes in network or flow conditions, or upon recognizing that the parameters with which the frame aggregator is initially configured are not well-suited for the particular flow. Referring back to FIG. 5, the frame aggregator 400 is suitable for use in some or all of the aggregators $310_1$-$310_Q$ which in turn are suitable for use in the modular switch 100. As discussed above, the frame aggregator 400 operates on a particular VoQ, such as the VoQ $302_1$, for example. Generally speaking, it is desirable to aggregate multiple data packets into a relatively long frame to better utilize the uplinks 110. On the other hand, long delays in assembling complete frames result in undesired or even unacceptable transmission delays. In a sense, the frame aggregator 400 balances these competing interests by monitoring the age and size of the corresponding queue, for example.

More specifically, in an embodiment, a frame aggregator manager 402 receives several configuration parameters such as the initial VoQ threshold value $Q_{TH}$ (input 404), the number N of crossbar devices in the second stage 408 (input 406), and a list of active uplink ports (input 408). Optionally, the frame aggregator manager 402 includes an input 410 to specify the slope $S_T$ indicative of how fast the threshold of the VoQ changes and an input 411 to specify the time $T_O$ that must elapse before the dynamic threshold value starts decreasing. In addition to the configuration parameters discussed above, the frame aggregator manager 402 receives an indication of how much data the VoQ currently stores (input 412) and a time signal (input 414). The frame aggregator manager 402 outputs a frame complete signal via an output 420 when the frame is complete and updates the corresponding parameter in a memory 424.

In operation, the frame aggregator manager 402 compares the current size of the VoQ as specified via the input 412 and compares this value to the dynamic frame threshold value stored in a memory location 430. If the current size of the VoQ exceeds the current threshold value, the frame aggregator manager 402 generates the corresponding signal at the output 420 so that the data packets stored in the VoQ are transmitted to the target PP.

Figure 7B:
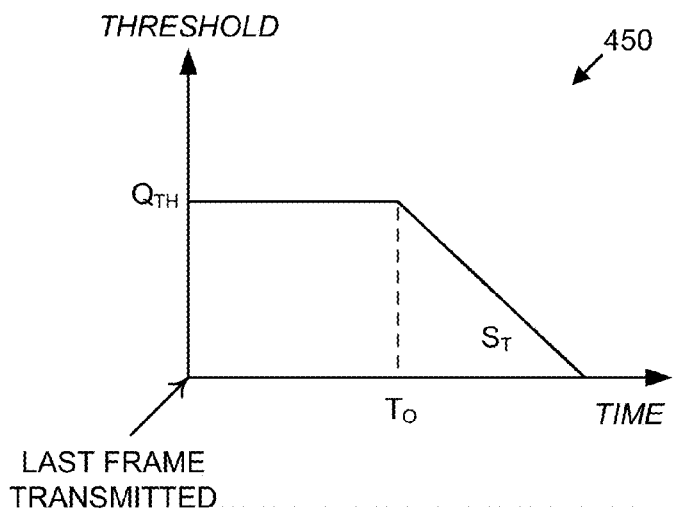
FIG. 7B is a diagram of an example queue threshold value plotted as a function of time in accordance with an embodiment of the present disclosure.

Using some or all of the configuration parameters 404-410 and some or all of the operational parameters 412, 414, and 422, the frame aggregator manager 402 determines whether the initial VoQ threshold value should be updated in the memory location 430 to prevent such conditions as queue starvation, for example, characterized by queuing a data packet and waiting for an excessively long time for the packet to continue or complete a frame. To this end, in accordance with an embodiment of the present disclosure, the frame aggregator manager 402 gradually decreases the dynamic threshold value so that fewer data packets are required to complete a frame. As an illustration of one example technique the frame aggregator manager 402 can apply, FIG. 7B depicts the dynamic queue threshold value plotted as a function of time.

In particular, a plot 450 illustrates that the dynamic threshold value remains at the initial level $Q_{TH}$ after a complete frame is transmitted and until the time $T_O$. Because the frame is still incomplete at the time $T_o$, the frame aggregator manager 402 begins to gradually decrease the threshold value in accordance with the parameter $S_T$. As a result, the size of an aggregated frame decreases and, typically, the number of data packets required to assemble a frame decreases.

In other embodiments, the frame aggregator manager 402 instead applies the simpler "aging" mechanism to trigger frame transmission whenever a data packet stored in the VoQ reaches a certain age. In this case, the frame may be padded with dummy packets if necessary. In yet other embodiments, the frame aggregator manager 402 adjusts the threshold value in view of the number of available crossbar devices and the available uplink ports reported via the inputs 406 and 408, respectively.

Figure 8:
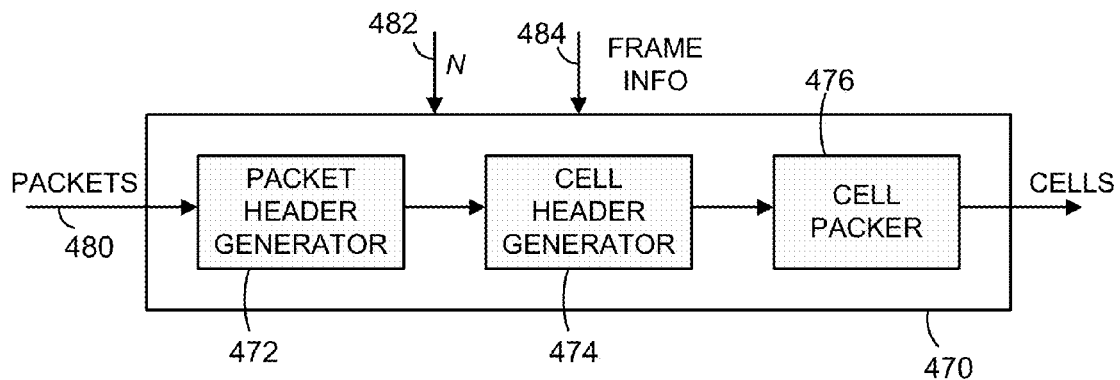
FIG. 8 is a block diagram of an example frame segmentation engine in accordance with an embodiment of the present disclosure.

Now referring to FIG. 8, a frame segmentation engine 470 is suitable for use in the pipeline 300 illustrated in FIG. 5 to divide a frame or, in some cases, an individual data packet into several cells. The frame segmentation engine 470 includes a packet header generator 472, a cell header generator 474, and a cell packer 476. The frame segmentation engine 470 receives data packets from an appropriate VoQ via an input 480. In at least some of the embodiments, a single frame segmentation engine 470 services multiple VoQ-frame aggregator portions of the data processing pipeline.

As discussed above, a frame as used by the modular switch 10 or 100 is a logical grouping of data packets (e.g., Ethernet data packets with MAC addressed overwritten to preserve space) characterized by a common target (such as a device and/or port) and a common priority. The frame segmentation engine 470 receives the data packets to be segmented into multiple cells via an input 480, and receives frame description, including at least the frame identity, via an input 482. Further, the frame segmentation engine 470 receives information indicating the number of available crossbar devices N via an input 484.

In accordance with an embodiment, the packet header generator 472 generates a respective packet header for each data packet as discussed with reference to FIGS. 4A and 4B, for example. Next, the cell header generator 474 generates a cell header according to the format illustrated in FIG. 4D, for example. In particular, the cell header generator 472 iteratively generates cell sequence numbers for the N cells, set the frame identity field 264 according to the information supplied via the input 484, and set the flags 268 and 270 as appropriate.

It is noted that the packet header generator 472 and the cell header generator 474 typically do not generate the same number of headers. Further, in some embodiments, the frame segmentation engine 470 does not include a packet header generator 472 at all, and frame headers are instead added to the appropriate VoQ upon arrival of the corresponding packet.

Thus, it is possible for at least some of the components discussed herein to operate in other stages in the processing pipeline.

With continued reference to FIG. 8, the cell packer 476 formats cells as discussed with reference to FIG. 4C, for example. To this end, the cell packer 476 generates a cell forwarding tag (see FIG. 4E) for each cell, computes the frame check sequence, and applies the cell header generated by the cell header generator 474.

Figure 9:
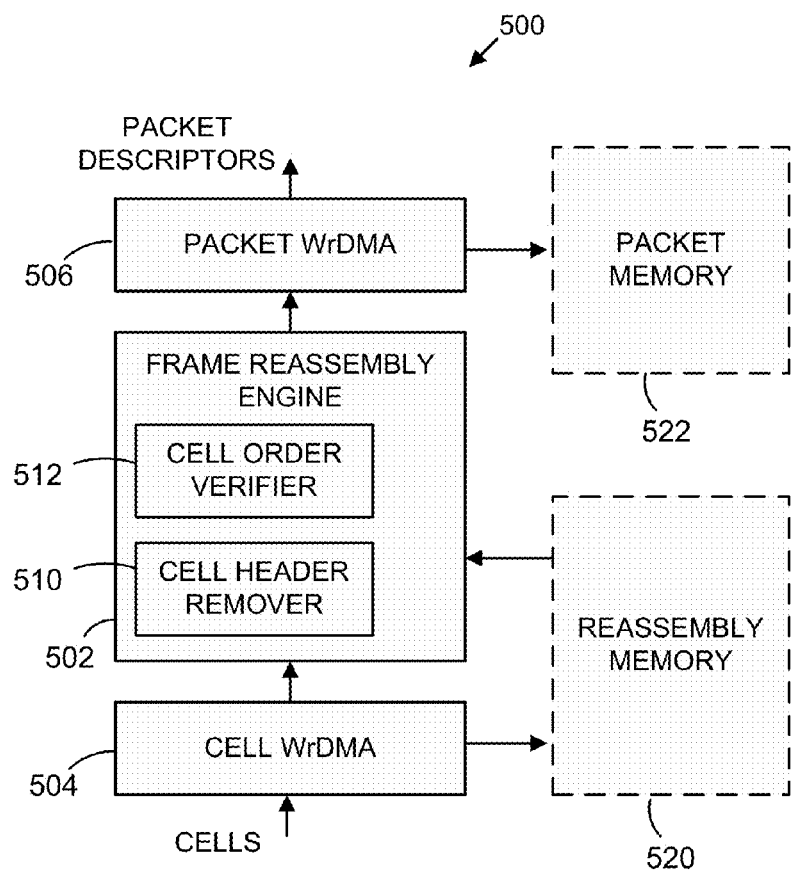
FIG. 9 is a block diagram of an example frame reassembly subsystem in accordance with an embodiment of the present disclosure.

Next, FIG. 9 illustrates an example frame reassembly subsystem 500 that operates in a target PP to reassemble one or more data packets transmitted in several cells from the source PP, in accordance with an embodiment of the disclosure. Generally speaking, the frame reassembly subsystem 500 for unicast flows manages one or several reassembly contexts, each corresponding to a particular source device and a particular priority. The reassembly subsystem 500 includes a reassembly engine 502 that receives cells from a cell write direct memory access (WrDMA) unit 504 and supplies the reassembled data packets to a packet WrDMA unit 506. The cell WrDMA unit 504 creates a descriptor for each cell and sends the descriptor and the cell header to the frame reassembly engine 502. Additionally, the cell WrDMA unit 504 stores the cell in the reassembly memory 520. In the embodiment seen in FIG. 9, the frame reassembly engine 502 includes a cell header remover 510 and a cell order verifier 512 to implement the logic of frame reassembly discussed with reference to FIGS. 10A and 10B.

In operation, the cell header remover 510 discards the cell header 252, the cell forwarding tag 256 (see FIG. 4C), or any other data used for routing the cell within the modular switch 10 or 100. The cell order verifier 512 then reads a reassembly memory 520 to determine whether frames can be assembled using the received cells, whether frames sent later in time are completed prior to frames sent earlier with the same priority, as well as other conditions. As seen in the embodiment of FIG. 9, reassembled data packets are stored in a packet memory 522, and the packet WrDMA unit 506 forwards packet descriptors through the processing pipeline.

Figure 10A:
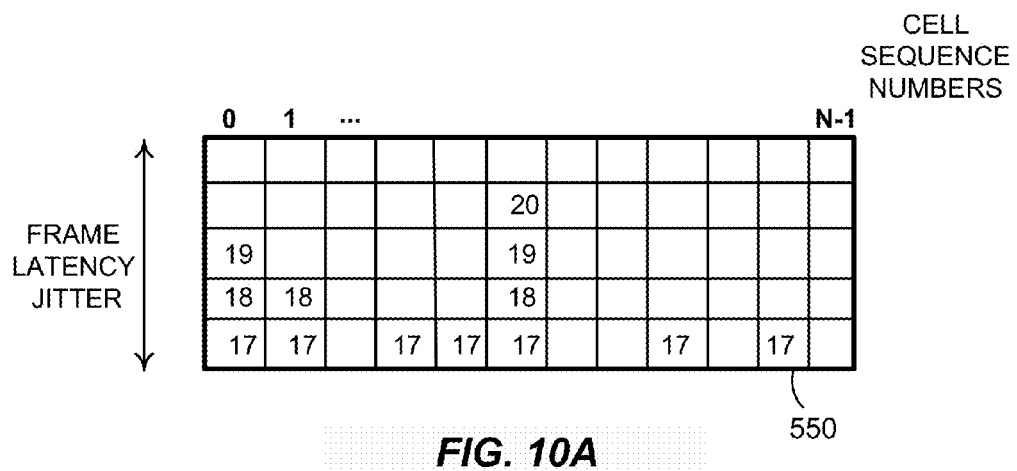
FIG. 10 is diagram that illustrates example assembly of several communication frames by the frame reassembly engine of FIG. 9 in accordance with an embodiment of the present disclosure.
Figure 10B:
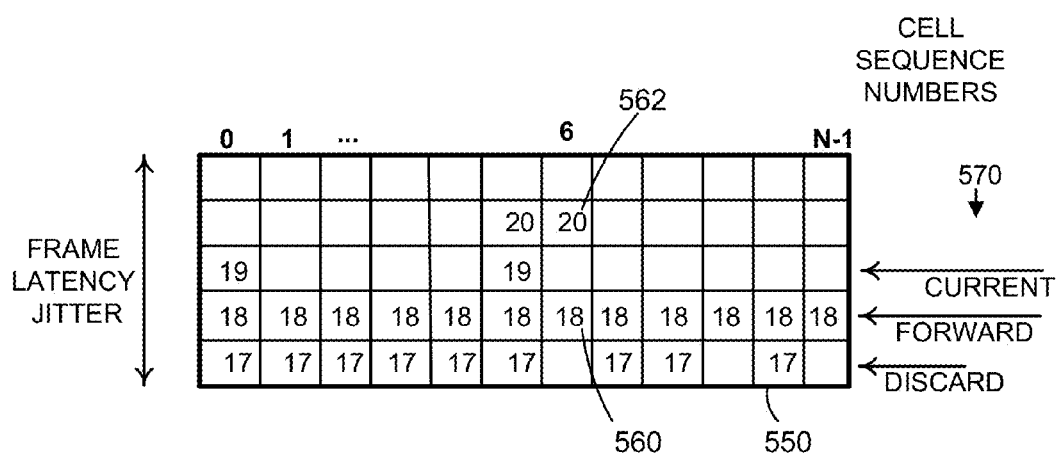

By way of further example, FIGS. 10A and 10B illustrate frame reassembly for a certain reassembly context 550 associated with a particular source and a particular priority (in the example, source=1, priority=3). In this example, the source corresponds to the source port on one of the PPs in the first stage 104, for example (see FIG. 1). In other embodiments, the source correspond to a source PP or to another parameter of the frame. The reassembly context 550 can be regarded as a two-dimensional table with each element corresponding to a certain cell of a certain frame. However, the frame reassembly subsystem 500 can maintain the certain reassembly context 550 in any suitable format (e.g., a linked list, several one-dimensional arrays).

Referring first to FIG. 10A, upon arrival of a new cell at a PP, the frame reassembly engine 502 of the PP places the cell into a corresponding location within the reassembly context 550 using, for example, the frame identity and cell sequence number fields included in the cell header, or any other suitable identifier for properly reassembling cells. FIG. 10A illustrates a state of the reassembly context 550 in which seven of the 12 cells of the frame 17, three cells of the frame 18, two cells of the frame 19, and one cell of the frame 20 have been received and stored.

Referring now to FIG. 10B, a cell 560 with sequence number 6 and frame identity 18 arrives at the PP followed by a cell 562 with the same sequence number 6 and frame identity 20. In response, the frame reassembly engine 502 determines that frame 19 cannot be completely received at least because the cell with the sequence number 6 and the frame identity 19 has been lost. In this regard, it is noted that when a first frame having a certain priority P propagates through the modular switch 10 or 100, a second frame having the same priority P and transmitted after the first frame cannot arrive at the destination ahead of the first frame. In other words, the frame aggregation and segmentation pipeline of a PP (see FIG. 5, for example) and, in particular, the arbiter 320, ensures that all cells of a frame are forwarded to crossbar devices prior to transmitting another frame having the same priority.

Upon receiving the cells 560 and 562, the frame reassembly engine 502, in accordance with an embodiment, chooses to discard the partially assembled frame 19 and generate an appropriate signal or alarm, if desired. Alternatively, the frame reassembly engine 502 waits until frames 18 and 20 are completely received prior to discarding frame 19. For example, as illustrated in FIG. 10B, frame 17 can be discarded upon receiving all the cells of frame 18. Once a frame is completely received, a frame pointer can advance.

Figure 11:
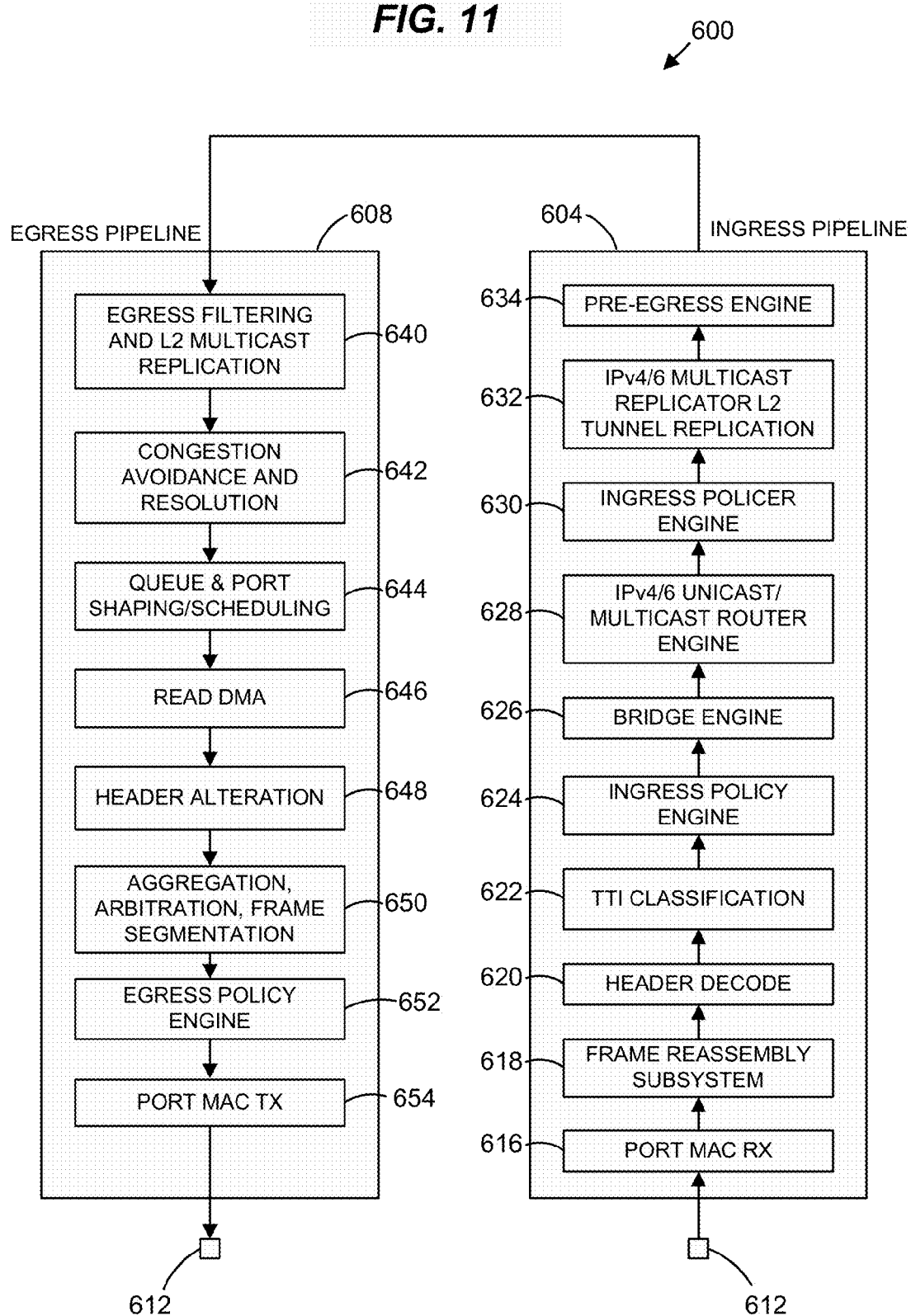
FIG. 11 is a block diagram of an example ingress/egress pipeline of a packet processor that includes some of the modules illustrated in FIGS. 5, 6, 7A, 8, and 9 in accordance with an embodiment of the present disclosure.

For clarity, FIG. 11 next illustrates a block diagram of an example ingress and egress pipeline 600 of a PP (such as the PP 120a, for example) that includes some of the components discussed above in accordance with an embodiment of the disclosure. The pipeline 600 is suitable for use in the forwarding engine (see FIG. 1) or the forwarding engine 150 (see FIG. 2). In one scenario, a data packet enters the pipeline 600 at a network port 102 and exits the pipeline 600 at an uplink port. In other scenario, a data packet enters the pipeline 600 at an uplink port and exits via a network port 102. The pipeline 600 includes an ingress pipeline 604 and an egress pipeline 608, each coupled to one or more ports 612. Additionally, the ingress pipeline 604 and the egress pipeline 608 are coupled together.

The one or more ports 612 are coupled to one or more networks such as a WAN, a LAN, such as a wired LAN or a wireless LAN, etc. As shown in FIG. 11, the ingress pipeline 604 and the egress pipeline 608 each include a plurality of units coupled in series. Generally, each unit of a pipeline optionally processes a frame, a portion of the frame (e.g., a header), or frame descriptor and then passes the frame, portion, or descriptor to the next unit in the pipeline. A descriptor includes some information from the frame, such as some or all of the header information of the data packet. In at least some of the embodiments, the descriptor includes other information as well such as an indicator of where the data frame is stored in a memory. Thus, when the present disclosure refers to processing, sending, or forwarding a frame, it is contemplated that, when appropriate, merely a descriptor of the frame is processed, sent, or forwarded additionally or alternatively. Similarly, when the present disclosure refers to processing, sending, or forwarding a descriptor, it is contemplated that, when appropriate, the frame associated with the descriptor is processed, sent, or forwarded additionally or alternatively.

Each unit processes or does not process a particular frame. For example, in some instances, a unit may simply forward a frame onto the next unit in the pipeline. Each or at least some of the units of the ingress pipeline 604 and the egress pipeline 608 may include, or otherwise be associated with, a corresponding memory. A data frame received by a unit in the pipeline 604 may be stored in the memory associated with the unit.

In accordance with an embodiment, the ingress pipeline 604 includes a port media access control (MAC) receiver unit 616 coupled to the one or more ports 612. The port MAC receiver unit 616 generally implements media access control functions and forwards the data frame to a frame reassembly subsystem 618 which is similar to the frame reassembly subsystem 500 depicted in FIG. 9 in accordance with an embodiment of the present disclosure. The frame reassembly subsystem 618 stores reassembled data packets in a memory and forwards packet descriptors to the header decode unit 620.

The header decode unit 620 generally decodes the header of each data unit such as a data packet received via the one or more ports 612. This includes parsing or identifying different segments of the header for use by subsequent units in the ingress pipeline 604 and, optionally, units in the egress pipeline 608.

A tunnel termination and interface (TTI) classification unit 622 is coupled to the header decode unit 620. The TTI classification unit 622 generally performs a lookup function (a tunnel termination interface (TTI) lookup) used for tunnel termination identification and/or classifying a logical interface according to L2 or L3 header fields. The TTI lookup indicates that the packet should be associated with one or more TTI actions, such as assigning a virtual LAN (VLAN) identifier, quality of service (QoS) parameters, etc., to the data frame. In an embodiment, if the TTI lookup utilizes a source port indicator, the local source port indicator is utilized.

In an embodiment, the TTI classification unit 622 utilizes a TCAM, and the TCAM stores TTI data associated with local source ports of the PP and does not store TTI data associated with non-local source ports of other PPs. The TTI classification unit 622 utilizes local source port indicators and/or global target port indicators to perform TCAM lookups. In this embodiment, duplicate TTI data need not be stored in multiple TCAMs of multiple PPs.

An ingress policy engine 624 is coupled to the TTI classification unit 622. In an embodiment, the ingress policy engine 624 allows Policy Control Lists (PCLs) to be applied to data frames based on criteria such as including Layer 2, Layer 3, and Layer 4 field content in the frame. In an embodiment, the ingress policy engine 624 is used to implement user applications such as Access Control Lists (ACLS), Quality of Service (QoS), policy-based VLANs, policy-based switching or routing, etc. For example, the ingress policy engine 624 assigns QoS attributes to a data frame, assign a VLAN to a frame, etc. The policy engine 624 is also suitable for tracking data flows in the switch that includes the PP. For example, the ingress policy engine 624 generally determines whether an ingressing frame belongs to a particular flow. In an embodiment, the ingress policy engine 624 utilizes the local source port indicator and/or the global target port indicator.

In an embodiment, the ingress policy engine 624 utilizes a TCAM, and the TCAM stores Policy Control Lists (PCL) data associated with local source ports of the PP and does not store PCL data associated with non-local source ports of other PPs. In an embodiment, the policy engine 624 utilizes local source port indicators and/or global target port indicators to perform TCAM lookups. In this embodiment, duplicate PCL data need not be stored in multiple TCAMs of multiple switch cores.

A bridge engine 626 is coupled to the ingress policy engine 624. The bridge engine 626 includes, or is coupled to, a forwarding database (not shown) for the PP that includes MAC addresses and ports corresponding to the MAC addresses. In an embodiment, the forwarding database for the PP also includes indications of devices (e.g., device numbers) corresponding to the MAC addresses. The bridge engine 626 generally handles the forwarding of packets destined for a segment of a network to which the switch is connected. The bridge engine 626 determines whether a received data frame should be forwarded to a different port and, if so, to which port (e.g., global target port indicator) the data frame should be forwarded. Determination of whether, and to where a data frame should be forwarded, may be done by examining the MAC destination address of the packet and determining to which target port and, in some embodiments, to which device (e.g., indicated by the device number) the destination address corresponds using the forwarding database. Also, other information may be utilized as well, such as VLAN information.

In an embodiment, the forwarding database for the PP includes associations between source MAC addresses and local source port numbers (for example, numbers of uplink ports illustrated in FIG. 2), and between target MAC addresses and global target port numbers. In an embodiment, local port numbers are unique within each PP mounted in a chassis (e.g., PPs 120a, 120b, etc. illustrated in FIG. 2), but are not unique across all PPs. In an embodiment, the forward database for the PP includes duplicate information as compared to forwarding databases of other PPs mounted in the chassis. In this embodiment, forwarding databases of the multiple PPs are synchronized so that forwarding data changed by one PP is provided to other PPs.

A router engine 628 is coupled to the bridge engine 626. If a received packet is not destined for a network to which the switch is connected, then routing based on an Internet Protocol (IP) address may be performed. The router engine 628 includes, or is coupled to a routing information database (not shown) that includes information corresponding to where IP packets should be forwarded. The router engine 628 generally determines to where a received IP packet should be routed. In an embodiment, this is done by examining the IP destination address of the packet and routing information stored in the routing information database. The router engine 628 also maintains a routing information database that specifies how data packets are routed between network ports. In an embodiment, the router engine 628 is compliant with IP version 4 (v4) and/or IP version 6 (v6). Of course, in other embodiments, the router engine 628 additionally or alternatively is compliant with one or more other IP versions including previous IP versions and IP versions not yet standardized. Additionally, the router engine 628 may be capable of determining destinations for multicast packets.

An ingress policer engine 630 is coupled to the router engine 628. In an embodiment, the ingress policer engine 630 generally performs rate limiting, makes flow traffic measurements, samples data frames, applies time stamps to data frames or to descriptors, etc.

A multicast replicator 632 is coupled to the ingress policer engine 630. The multicast replicator 632 generally replicates multicast packets, if necessary, for forwarding via multiple ports. The multicast replicator 632 is compliant with IP v4 and/or IP v6, for example. Additionally, in an embodiment, the multicast replicator 632 supports a multicast extension to the Layer Two Tunneling Protocol (LTTP).

A pre-egress engine 634 is coupled to the multicast replicator 632. The pre-egress engine 634 generally analyzes decisions made by previous units in the ingress pipeline 604 and drops, forwards or duplicates the frame or descriptor to the egress pipeline 608 based on the analysis. In an embodiment, the pre-egress engine 634 mirrors and/or traps data frames to a separate CPU unit, when appropriate. The PP includes an interface (not seen in FIG. 11) to the external CPU via which frames are forwarded to the CPU. In an embodiment, the CPU interface is designated a specific local target port indicator (e.g., the number 63), and thus the pre-egress engine 634 can forward data frames to the CPU via the CPU local port. In another embodiment, the port via which frames can be forwarded to the CPU is designated by a global port indicator.

The pre-egress engine 634 is coupled to the egress pipeline 608 so that the pre-egress engine 634 can send frame descriptors to the egress pipeline 608. In particular, the ingress pipeline 604 is coupled to an egress filtering and Layer-2 multicast replication unit 640. In an embodiment, the egress filtering and Layer-2 multicast replication unit 640 performs filtering based on the local target port indicator, and also performs filtering based on the global source port indicator. In an embodiment, the egress filtering and Layer-2 multicast replication unit 640 also implements one or more of the following: VLAN egress filtering, spanning tree egress filtering, source port/trunk (utilizing global source port indicator) group egress filtering for multi-target data frames, egress port (utilizing local target port indicator) unregistered multicast and unknown unicast filtering, source identifier (ID) multi-target filtering, etc.

The egress filtering and Layer-2 multicast replication unit 640 also replicates multicast data frames. In a multicast data frame, a multi-target destination is indicated via a multi-target group index, also known as VIDX, in an embodiment. If a data frame is multi-target (i.e. broadcast, multicast, or unknown unicast), the descriptor is replicated for each egress port member of the VIDX group. In an embodiment, the VIDX group data only for local target ports is stored in a memory, and VIDX group data for non-local target ports is not stored in the memory. Rather, VIDX group data for non-local target ports is stored in one or more memories associated with other switch cores. Similarly, other tables utilized by the egress filtering and Layer-2 multicast replication unit 640, in an embodiment, provide data only for local target ports. Such tables can include one or more of a VLAN table, an SPG table, a non trunk members table, a designated port table, etc.

The egress filtering and Layer-2 multicast replication unit 640 forwards unicast traffic to one of a plurality of transmit queues. For Layer-2 duplicated data frames, the egress filtering and Layer-2 multicast replication unit 640 replicates the data frame to local ports according to a distribution list. In an embodiment, the egress filtering and Layer-2 multicast replication unit 640 also provides a copy of the data frame to a transmit queue corresponding to a neighbor PP. In an embodiment, the transmit queue corresponding to the neighbor PP is designated a specific local target port indicator (e.g., the number 24), and thus the egress filtering and Layer-2 multicast replication unit 640 provides a copy of the data frame to the local target port corresponding to the neighbor switch core. In this embodiment, multicast data frames are forwarded amongst the switch cores, and the transmit queue corresponding to the last in the chain terminates the relayed copy to prevent loops. In another embodiment, transmit queue corresponding to the neighbor switch core is designated a specific global target port indicator.

The egress filtering and Layer-2 multicast replication unit 640 forwards the descriptor, along with a distribution port list, including local port indicators, to a congestion avoidance and resolution unit 642. The congestion avoidance and resolution unit 642 generally performs flow control functions such as generating pause notifications and congestion notifications.

A queue and port shaping/scheduling unit 644 is coupled to the congestion avoidance and resolution unit 642. The queue and port shaping/scheduling unit 644 generally enqueues packet descriptors in a plurality of transmit queues, for example, and performs rate shaping and scheduling functions. Frames are enqueued according to local target port indicators.

A read DMA unit 646 reads data frames from a memory. The read DMA unit 646 is coupled to and reads data from memories of other PPs as well as the memory associated with the PP that includes the pipeline 600. A header alteration unit 648 is coupled to the DMA unit 646. The header alteration unit 648 generally alters the header of a frame as needed. For example, a source address, a destination address, etc. is altered for a next hop, a tunnel header is prepended if the packet is to be forwarded to a tunnel start interface, etc.

An aggregation, arbitration, and frame segmentation unit 650 includes some or all of the components of the aggregation and segmentation pipeline 300, for example (see FIG. 5), and/or the frame aggregator 400 as well as the frame segmentation engine 470. In other embodiments, some of the component related to aggregation and segmentation are distributed among several components of the egress pipeline 608.

Further, an egress policy engine 652 is coupled to the output of the unit 650. The egress policy engine 652 generally determines a flow to which an egressing data frame belongs and attaches a flow identifier to the egressing data frame.

A port MAC transmit unit 654 is coupled to the egress policy engine 652. The port MAC transmit unit 654 generally implements media access control functions and forwards packets to appropriate ports 612. The port MAC transmit unit 652 also forwards or mirror packets to the CPU (not shown).

It is noted that the modular switch 100 can efficiently utilize the aggregate bandwidth of multiple uplinks 110, each of which is relatively slow compared to the rate at which network traffic enters or leaves one of the network ports 102. In particular, the modular switch 100 in some cases splits incoming data packets into smaller units and routes these units to ports on other cards. Further, by assigning aggregators to each VoQ and by associating each VoQ with a particular destination as well as a particular priority, the modular switch 100 improves the reliability and efficiency of communications across devices and cards mounted in the chassis of the modular switch 100. Still further, by formatting frames, packets, and cells as described above, devices communicating via the uplinks 110 ensure that frames can be accurately assembled (or discarded when necessary) even if the crossbar devices in the second stage 108 are not completely synchronized, and cells arrive at the destination PPs at different times.

Further, frame and cell formatting techniques discussed herein permit the modular switch 10 or 100 to transmit a single data packet or, in some cases, a portion of a data packet in a frame. Using this mode of operation (which may be referred to as the "cut-through" mode), the switch propagates a relatively long data packet through the line cards and the fabric cards without delay. Each data packet is sent to the target upon arrival without aggregation in a VoQ, but the target device may need to reassemble several frames into the packet. As discussed above, the cell header includes first cell and last cell flags that allow sequences of cells to span multiple frames. In some cases, the last frame in a sequence that conveys a large data packet is padded to match a pre-configured cell size. To enable the cut-through mode of operation, a user disables aggregation for the corresponding VoQ, or configure the VoQ with a cell size that exceeds the length of a frame.

Figure 12:
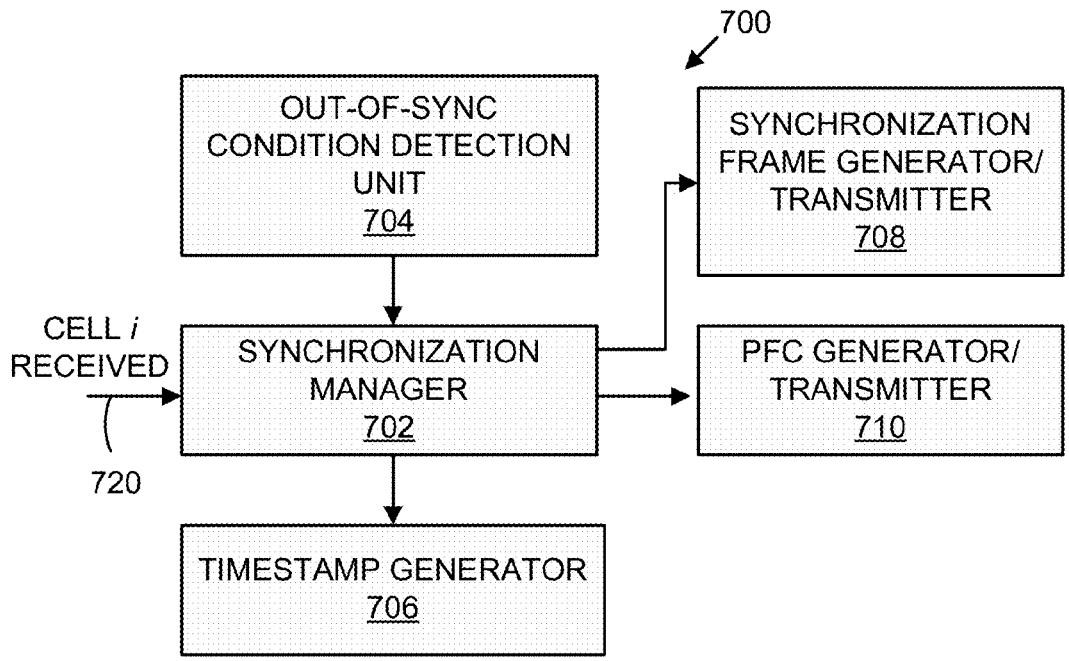
FIG. 12 is a block diagram of an example crossbar synchronizer in accordance with an embodiment of the present disclosure.

Referring now to FIG. 12, an example crossbar synchronizer 700 is suitable for use additionally or alternatively to the AFM manager 152 in the forwarding engine 150 of a PP (see FIG. 1). Generally speaking, the crossbar synchronizer 700 determines when one or several crossbar devices operating in a chassis lose synchronization and/or begin to drop an abnormal number of cells, and automatically generates a synchronization message or initiates a synchronization sequence to restore synchronization between the crossbar devices. The crossbar synchronizer 700 includes a synchronization manager 702 coupled to an out-of-sync condition detection unit 704, a timestamp generator 706, a synchronization frame generator 708, and a priority flow control (PFC) generator and transmitter 710.

The out-of-sync condition detection unit 704 co-operates with the frame reassembly subsystem 500, for example, that tracks individual cells using frame reassembly contexts such as the one illustrated in FIGS. 10A-B. Because each cell travels along a definite patch from a source PP to a target PP via one of the fabric cards, the out-of-sync condition detection unit 704 uses the appropriate frame reassembly context to determine whether one of the crossbar devices excessively drops cells, for example. Further, the frame reassembly subsystem 500 and/or the out-of-sync condition detection unit 704 compares the time at which cells arrive at the target PP to determine whether there appears to be a clock misalignment between crossbar devices.

In some embodiments, the out-of-sync condition detection unit 704 generates the out-of-sync notification when memory consumption in a certain reassembly context reaches a certain threshold. Referring back to FIGS. A-B, each reassembly context is associated with a certain priority (or TC) and a certain source, and the amount of memory consumed by the reassembly context depends on how many partially assembled frames are currently being stored in memory.

In other embodiments, the out-of-sync condition detection unit 704 generates the out-of-sync notification when total depth of a reassembly context, defined as the number of frame identities currently being processed in the reassembly context, reached a certain threshold. In the example illustrated in FIG. 10A, for example, the depth is four (17, 18, 19, and 20).

In yet other embodiments, the out-of-sync condition detection unit 704 generates the out-of-sync notification upon detecting a certain number of cyclic redundancy check (CRC) errors, which is configurable for each reassembly context in accordance with an embodiment of the present disclosure.

Upon receiving an out-of-sync condition indication from the unit 704, the synchronization manager 702 instructs the synchronization frame generator 708 to generate a synchronization frame. Alternatively, the crossbar synchronizer 700 transmits the synchronization frame on demand or according to a pre-configured schedule. In response to receiving the out-of-sync condition indication, the synchronization frame generator 708 formats a "dummy" frame and specifies own PP as the target. For example, the crossbar synchronizer 700 may operate in the PP 120a, and the synchronization manager 702 can generate a synchronization frame to be transmitted to a certain uplink port of the PP 120a. In some embodiments, the uplink port at which a PP receives the synchronization frame is predefined. In other embodiments, this port is user-configurable.

The crossbar synchronizer 700 can transmit the synchronization frame in the manner similar to transmitting other communication frames. Methods and apparatus for correcting clock wander that can be suitably adapted for use by cross bar synchronizer are described in co-pending U.S. patent application Ser. No. 12/683,878, filed on Jan. 7, 2010, entitled "Method and Apparatus for clock wander compensation," and in U.S. Provisional Patent Application No. 61/143,287, entitled "Periodic Clock Wander Compensation" which was filed on Jan. 8, 2009, both of which are incorporated herein by reference in their entireties. In particular, the synchronization frame is segmented into N cells, each of which is transmitted to a respective one of the N crossbar devices. As the crossbar devices forward the N cells back to the PP from the synchronization frame has originated, the synchronization manager 702 receives an indication of the time when each cell is received at an input 720. The timestamp generator 706 then generates a timestamp for each received cell i.

Upon receiving all of the N cells of the synchronization frame or upon timeout expiration, the synchronization manager 702 calculates the differences between the times when each cell was received. In a frilly synchronized modular switch, each cell of the synchronization frame arrives at the PP at the same, and each time difference accordingly is zero. However, in a modular switch that is not fully synchronized, at least some of the timestamps associated with the cells are different.

Next, the synchronization manager 702 selects the timestamp of one or several cells of the synchronization frame that arrived last, and use this time as a synchronization reference point. More specifically, the synchronization manager 702 calculates, for each crossbar device, the amount of time by which the crossbar device is ahead of the "slowest" crossbar device that forwarded the last cell. The priority flow control (PFC) generator 710 then transmits a PFC message to each crossbar device specifying a respective time during which the crossbar device should suspend communications. Alternatively, the PFC generator 710 transmits the PFC to a particular (e.g., the "fastest") crossbar device.

In some of the embodiments, the PFC message specifies the time for a particular class of service or traffic class (TC), or separately specifies the time for each TC. Thus, if a crossbar implements a separate state machine for each TC, the PFC message need not have the same impact on every state machine.

Figure 13:
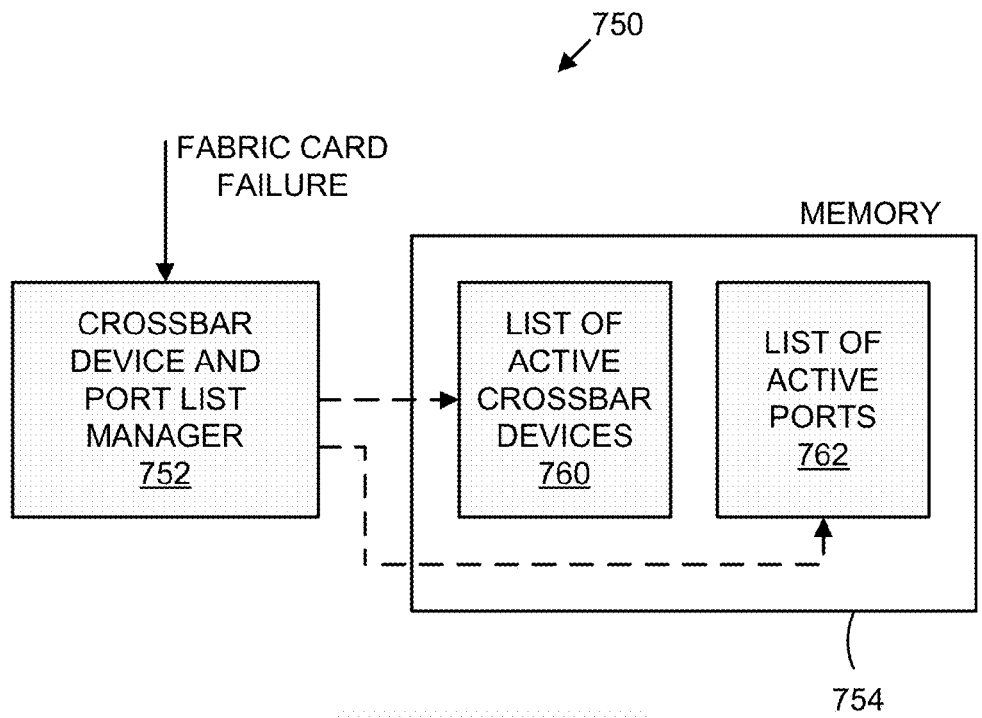
FIG. 13 is a block diagram of an example failover controller in accordance with an embodiment of the present disclosure.

Referring to FIG. 13, a failover controller 750 operates as the failover controller 154 in conjunction with some or all of the components of the AFM manager 152 forwarding engine 150 of a PP (see FIG. 1) to efficiently address device failures in the modular switch 100. The failover controller 750 includes a crossbar device and port list manager 752 and a memory 754 that stores a list of active crossbar device 756 and a list of active uplink ports 758. Upon receiving an indication that a certain fabric card has failed, the crossbar device and port list manager 752 automatically updates the list of active fabric cards to remove the failed fabric card, and updates the list of active uplink ports to remove the uplink ports formerly serviced by the crossbar devices disposed on the failed fabric card. The number of crossbar devices N is accordingly updated to N'. Upon recovery of the fabric card, the failover controller 750 restores the lists 756 and 758 to include the resources associated with the recovered fabric card, and updates N' back to N.

In one embodiment, each PP includes a failover controller 750 that automatically updates the corresponding memory 754 in response to a signal broadcast through the chassis. In another embodiment, the failover controller 750 resides on a separate card, and the memory location 754 is accessible to every line card on the chassis. Further, the failover controller 750 in some embodiments processes failure and recovery indications specific to individual crossbar devices in addition to or instead of fabric cards.

It is noted that the changes in resources due to card/device failure and recovery can be transparent to a reassembly subsystem such as the subsystem 500. In particular, because the subsystem 500 checks both cell sequence numbers and first cell and last cell flags (see FIG. 4D), the subsystem 500 can unambiguously identify frames that are complete. For example, the PP 120a transmits a frame as 32 cells having corresponding cell sequence numbers 0, 1, . . . 31. The first cell flag in the header of the cell with the cell sequence number 0 is set to TRUE, and the last cell flag in the cell with the cell sequence number 31 is set to TRUE. If, for example, the failover controller 750 determines that the fabric card 116a has failed, the failover controller 750 updates N=32 to N'=28 and updates the memory 754 as described above. The PP 120a then transmit a new frame as 28 cells having corresponding cell sequence numbers 0, 1, . . . 27, with the first cell flag in the header of the cell with the cell sequence number 0 set to TRUE, and the last cell flag in the cell with the cell sequence number 27 set to TRUE. The corresponding reassembly subsystem can thus identify the beginning, the end, and length of each sequence of cells irrespective of whether the reassembly subsystem is aware of fabric card failures or additions.

Next, several example methods for implementing the techniques described herein are discussed with reference to flow diagrams of FIGS. 14-16.

Figure 14:
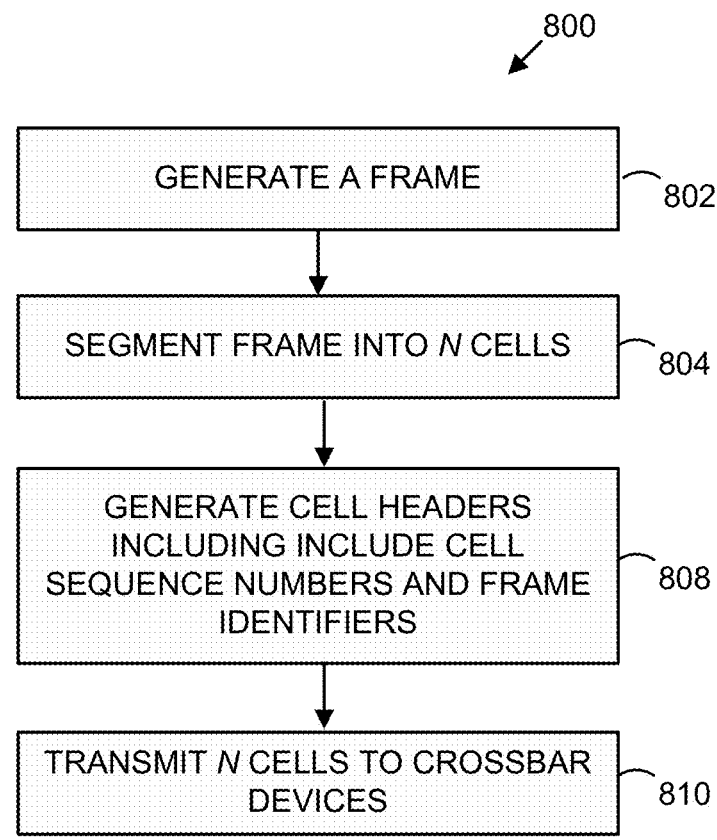
FIG. 14 is a flow diagram of an example method for generating a communication frame and transmitting the communication frame to multiple crossbar devices as several cells in accordance with an embodiment of the present disclosure.

FIG. 14 is a flow diagram of an example method 800 for generating and transmitting a communication frame from a source device to a destination device. At least some of the blocks 802-810 are suitable for use in the frame aggregation and segmentation pipeline 300, and the frame segmentation engine 470 can implement the block 808, for example. At block 802, a device such as a PP 120a generates a communication frame that includes one or several data units such as Ethernet data packets, for example. In some embodiments, it is also possible for a single packet to span multiple communication frames, and in these cases a communication frame includes only a portion of the data packet. At block 804, the communication frame is segmented into N cells, the number N being determined by the number of available crossbar devices. In another sense, N corresponds to the number of uplinks ports that the PP can use to transmit the one or more data packets included in the communication frame to the target. In some embodiments, a communication frame generated at block 802 uniquely corresponds to a particular target (e.g., device, port) and a particular priority (or class of service).

At block 808, a header is generated for each cell including the frame identifier and the cell sequence number. In some embodiments, the cell header is formatted as illustrated in FIG. 4D. At block 810, the N cells are transmitted in parallel to a target device via N crossbar devices.

Figure 15:
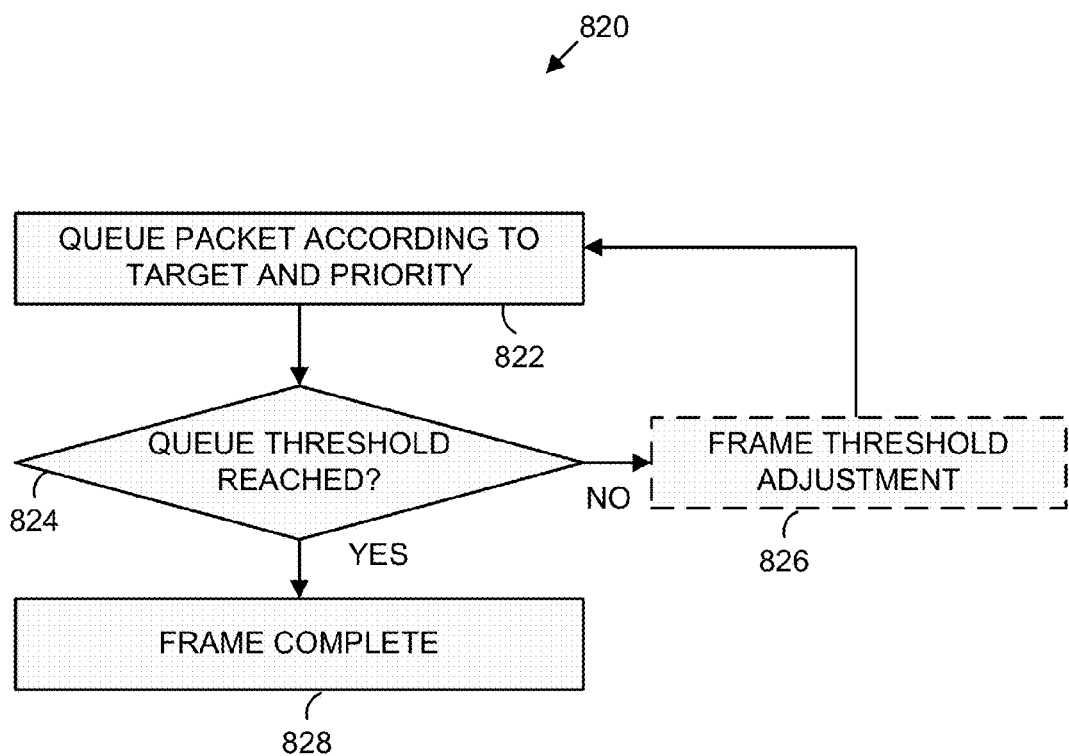
FIG. 15 is a flow diagram of an example method for aggregating one or several data packets into a communication frame in accordance with an embodiment of the present disclosure.

FIG. 15 is a flow diagram of an example method 820 for aggregating one or several data packets into a communication frame which the aggregation and segmentation pipeline 300 and/or the frame aggregator 400 can implement. At block 822, a data packet is added to a queue such as a VoQ based on the destination and the priority of the data packet. Next, the amount of data currently stored in the VoQ is compared to a queue threshold value that is dynamic in at least some of the embodiments (block 824). In accordance with an embodiment of the present disclosure, if the size of the queue is below the threshold value, frame threshold adjustment is performed at block 826. In at least some of the embodiments, the frame threshold is adjusted as described above with reference to FIGS. 7A-B. On the other hand, if the threshold value has been reached, a frame complete indication is generated in block 828.

Figure 16:
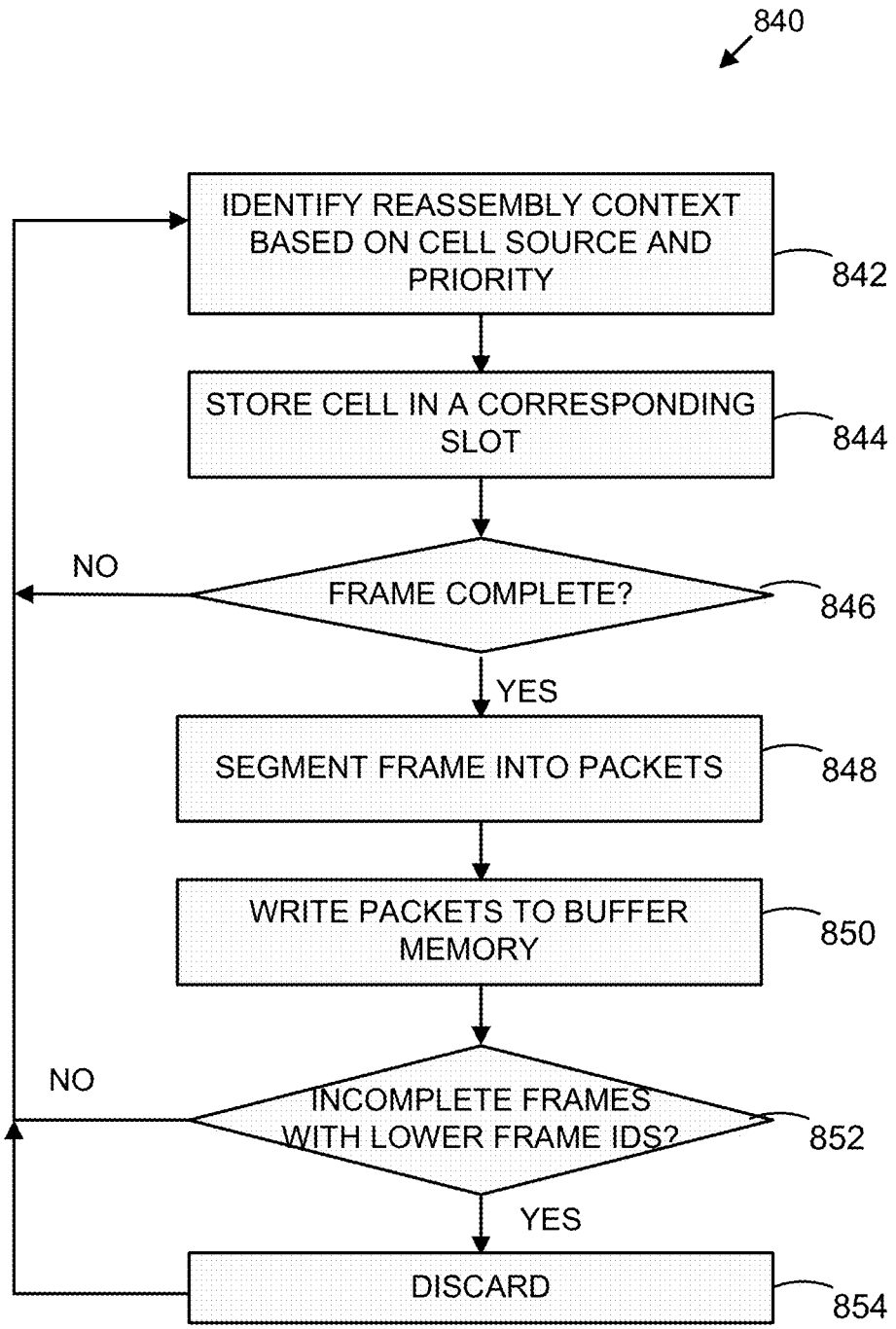
FIG. 16 is a flow diagram of an example method for processing received cells at a packet processor in accordance with an embodiment of the present disclosure.

FIG. 16 is a flow diagram of an example method 840 for processing received cells at a PP. The frame reassembly subsystem 500 or 618 can implement at least some of the blocks of the method 840. At block 842, the reassembly context of a received cell is identified based on the source of the cell included in the cell forwarding tag (see FIG. 4E) and the priority of the frame identified in the cell header (see FIG. 4D). The cell is then stored in a corresponding slot of the reassembly context which is implemented as a two-dimensional table in a memory in one example embodiment (see FIGS. 10A-B), and the method 840 checks whether a complete frame has been collected (block 846). The method 840 continues to receive and process further cells in block 842 if a frame has not been assembled. Otherwise, at block 848, a completed frame is disassembled into the one or several data packets (or, in some cases, into a portion of a long data packet spanning multiple frames). The cell forwarding tag, the cell header, and any other information used for internal routing is removed at block 848.

At block 850, the data packet is written to an internal memory where it can be accessed by other components of the ingress pipeline. Additionally, the method 840 checks whether any cells with frame identifiers lower than the frame identifier of the completed frame remain in the reassembly context (block 852). If such cells are discovered, the cells are removed in block 854. Otherwise, the method 840 returns to block 842.

Figure 17:
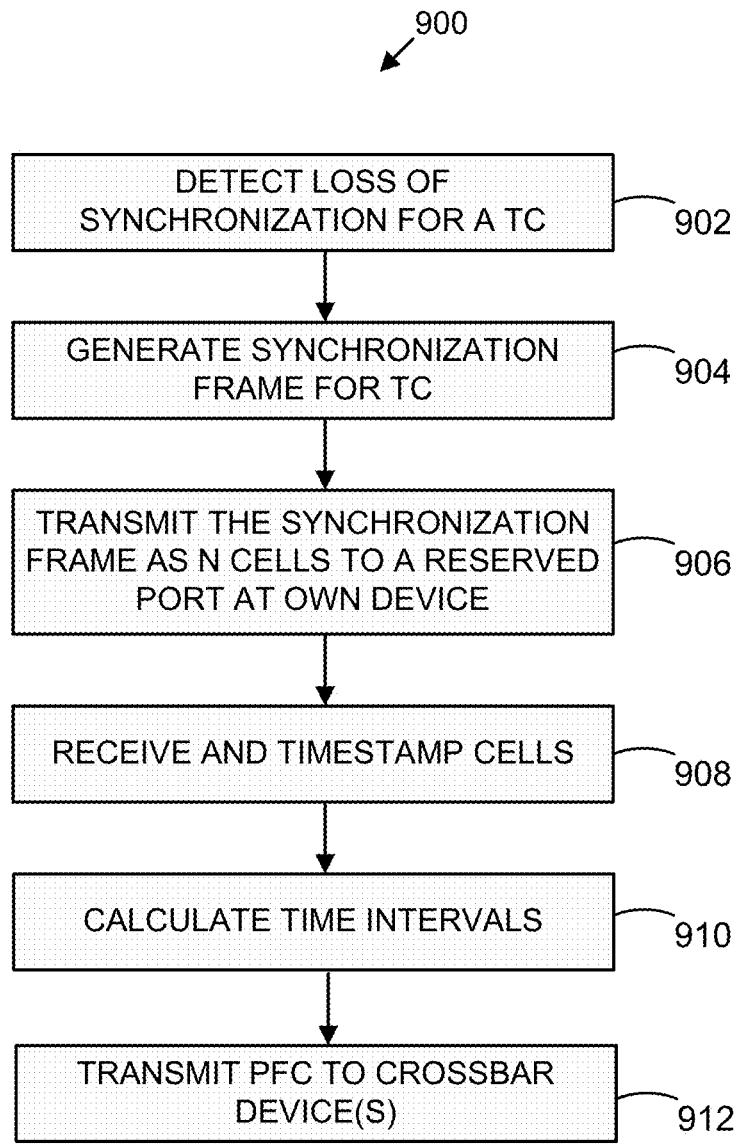
FIG. 17 is a flow diagram of an example method for synchronizing one or several crossbar devices in accordance with an embodiment of the present disclosure.

FIG. 17 is a flow diagram of an example method 900 for synchronizing one or several crossbar devices. The crossbar synchronizer 154 or the 700 can implement the method 900 partially or in its entirety. At block 902, loss of synchronization is detected for a particular Traffic Class (TC). In some cases, loss of synchronization is associated with a loss of M packets, a certain number of consecutive CRC errors, etc. At block 904, a synchronization frame is generated and transmitted to a certain port at the device in which the crossbar synchronizer 154 or the 700 resides as N cells. In at least some of the embodiments, the synchronization frame is generated for a particular TC.

The N cells are received and timestamped at block 908. Based on the difference between the timestamps, time intervals for at least one crossbar device are calculated at block 910. In some cases, time intervals are calculated for each crossbar devices. In other cases, a time interval is calculated for a particular crossbar device. In general, each time interval specifies the time during which the state machine of the crossbar device associated with the identified TC should remain silent. Next, a PFC message specifying the respective time interval is transmitted to at least one crossbar device. In an embodiment, the PFC message specifies a corresponding time interval for each TC.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

From the foregoing, it is noted that one example method for processing network traffic in a modular switching device includes receiving a communication unit at a source device, where the communication unit is associated with a unique communication unit identifier; dividing the communication unit into a plurality of transmission units, where each of the plurality of transmission units includes a position identifier indicative of a position of the transmission unit within the communication unit and the communication unit identifier; and causing the plurality of transmission units to be transmitted in parallel to respective ones of a plurality of connecting devices, where each of the plurality of connecting devices connects the source device to the target. In an embodiment, each of the plurality of transmission units further includes at least one of a first flag that indicates that the transmission unit is the first transmission unit in the communication unit, and a second flag that indicates that the transmission unit is the last transmission unit in the communication unit. In an embodiment, the communication unit is associated with a particular type of traffic such as a class of service, a traffic class, or one of a plurality of priority levels.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing network traffic in a modular switching device that includes a plurality of packet processors interconnected by a plurality of connecting devices, wherein the plurality of packet processors includes a first packet processor and a second packet processor, the method comprising:
   receiving, at the first packet processor, one or more data packets via a network port of the first packet processor;
   storing the one or more data packets in a queue;
   generating, at the first packet processor, a communication unit that includes at least a portion of a first data packet in the one or more data packets, wherein the communication unit is associated with a unique communication unit identifier, wherein the communication unit is to be transmitted to the second packet processor, and wherein generating the communication unit is responsive to an amount of data in the queue meeting a threshold value associated with the queue;
   dividing the communication unit into a plurality of transmission units;
   assigning a respective position identifier to each transmission unit of the plurality of transmission units, wherein the position identifier is indicative of a position of the respective transmission unit within the communication unit;
   including the communication unit identifier in each transmission unit of the plurality of transmission units;
   including an indicator of the second packet processor in each transmission unit of the plurality of transmission units, the indicators of the second packet processor to inform the plurality of connecting devices that the transmission units are to be directed by the plurality of connecting devices to the second packet processor among the plurality of packet processors; and
   causing the plurality of transmission units to be transmitted in parallel to respective ones of the plurality of connecting devices via a plurality of uplinks.

2. The method of claim 1, further comprising:
   assigning a respective first flag to each of the plurality of transmission units, wherein the first flag indicates whether the transmission unit is a first transmission unit in the communication unit; and
   assigning a respective second flag to each of the plurality of transmission units, wherein the second flag indicates whether the transmission unit is a last transmission unit in the communication unit.

3. The method of claim 1, wherein generating the communication unit comprises including the one of more data packets in the communication unit if a total length of the one or more data packets meets the threshold value associated with the queue.

4. The method of claim 3, wherein the queue is associated with one of the second packet processor or a target port on the second packet processor;
   wherein storing the one or more data packets in the queue comprises storing only data packets that are to be transmitted to the one of the second packet processor or the target port in the queue.

5. The method of claim 4, further comprising dynamically adjusting the threshold value associated with the queue in response to at least one of:
   an age of one of the one or more data packets; and
   an amount of time elapsed since a previous communication frame was transmitted.

6. The method of claim 4, wherein the queue is associated with a common type of traffic, wherein the type of traffic is one of a class of service, a traffic class, or one of a plurality of priority levels;
   wherein the method further comprises determining that each of the one or more data packets is associated with the common type of traffic prior to storing each of the one or more data packets in the queue; and
   wherein the communication unit only includes data packets associated with the common type of traffic.

7. The method of claim 1, wherein generating the communication unit includes:
   dividing a first data packet in the one or more data packets into a plurality of portions;
   including one or more portions of the first data packet in the communication unit such that the communication unit does not include all of the plurality of portions of the first data unit.

8. The method of claim 1, wherein the plurality of transmission units consists of N transmission units of equal size; and wherein the plurality of connecting devices consists of N connecting devices, wherein N is a positive integer greater than one.

9. The method of claim 1, wherein generating the communication unit includes:
   removing respective one or more Ethernet headers from the one or more data packets.

10. A modular switching apparatus, comprising:
    a plurality of processing devices including a first processing device and a second processing device;
    a plurality of connecting devices, wherein each of the plurality of connecting devices is coupled to each of the plurality of processing devices via a respective uplink;

wherein the first processing device is configured to (i) store one or more data packets in a queue, (ii) generate a communication frame responsive to an amount of data in the queue meeting a threshold value associated with the queue, and (iii) transmit a plurality of portions of the communication frame to the second processing device, wherein each of the plurality of portions is transmitted via a respective one of the first plurality of uplinks in parallel with the rest of the plurality of portions;

wherein the first processing device is configured to format the plurality of portions such that each of the plurality of portions includes (i) a unique identifier of the communication frame, (ii) a position identifier that identifies a position of the portion within the communication frame, and (iii) an indicator of the second packet processor;

wherein each of the plurality of connecting devices is configured to determine that a respective portion of the communication frame is to be forwarded to the second processing device from among the plurality of processing devices at least by analyzing the indicator of the second packet processor in the respective portion of the communication frame and to responsively forward the respective portion of the communication frame to the second processing device.

11. The modular switching apparatus of claim 10, wherein the first processing device includes a network port at which data included in the communication frame is received;

wherein the network port is associated with a first speed of transmission;

wherein each of the uplinks is associated with a second speed of transmission; and wherein the first speed of transmission is greater than the second speed of transmission.

12. The modular switching apparatus of claim 10, wherein there are N devices in the plurality of connecting devices and N portions in the plurality of portions of the communication frame;

wherein the modular switching apparatus further comprises:

a memory unit to store a value of N; and a failover controller configured to:

determine a number of the plurality of connecting devices are not operational, and subtract the number of connecting devices that are not operational from N.

13. The modular switching apparatus of claim 10, wherein the queue is a first queue in a plurality of queues and the communication frame is a first communication frame, and wherein the first processing device includes:

a memory unit to store the plurality of queues, wherein the first queue corresponds to a particular type of flow and the second processing device;

wherein the first processing device is configured to:

aggregate data packets in each of the plurality of data queues into respective communication frames including aggregating multiple data packets from the first queue into the first communication frame, and transmit the communication frames to the plurality of connecting devices via uplinks coupled to the first processing device.

14. The modular switching apparatus of claim 13, wherein the first processing device further includes a frame aggregator manager to dynamically control a threshold value indicative of a minimum amount of data in the first queue that can be aggregated into the first communication frame.

* * * * *